Nov. 22, 1932. W. D. LIPPS 1,888,352
MACHINE FOR MAKING BRUSHES
Filed Jan. 8, 1932 14 Sheets-Sheet 3
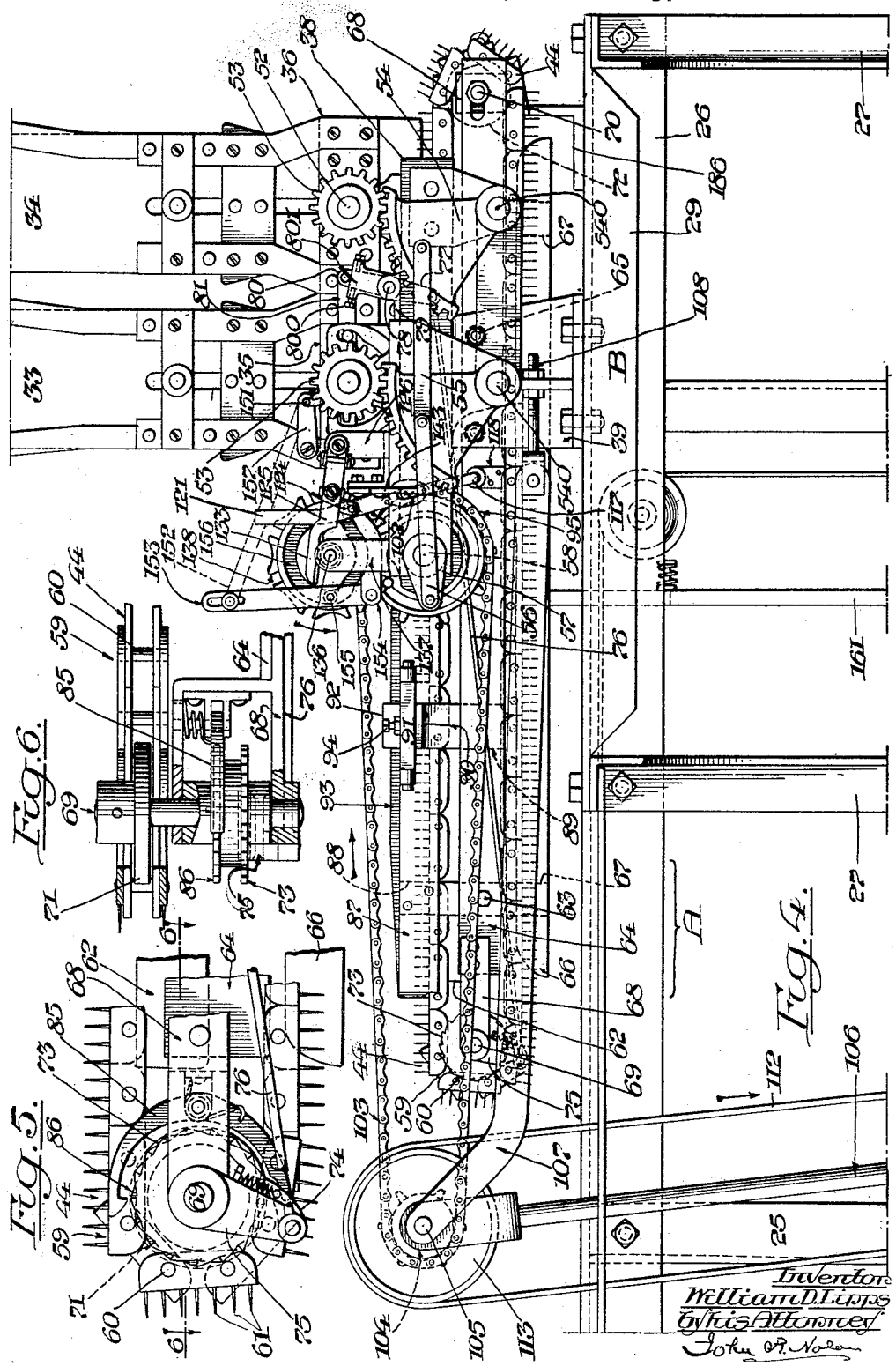

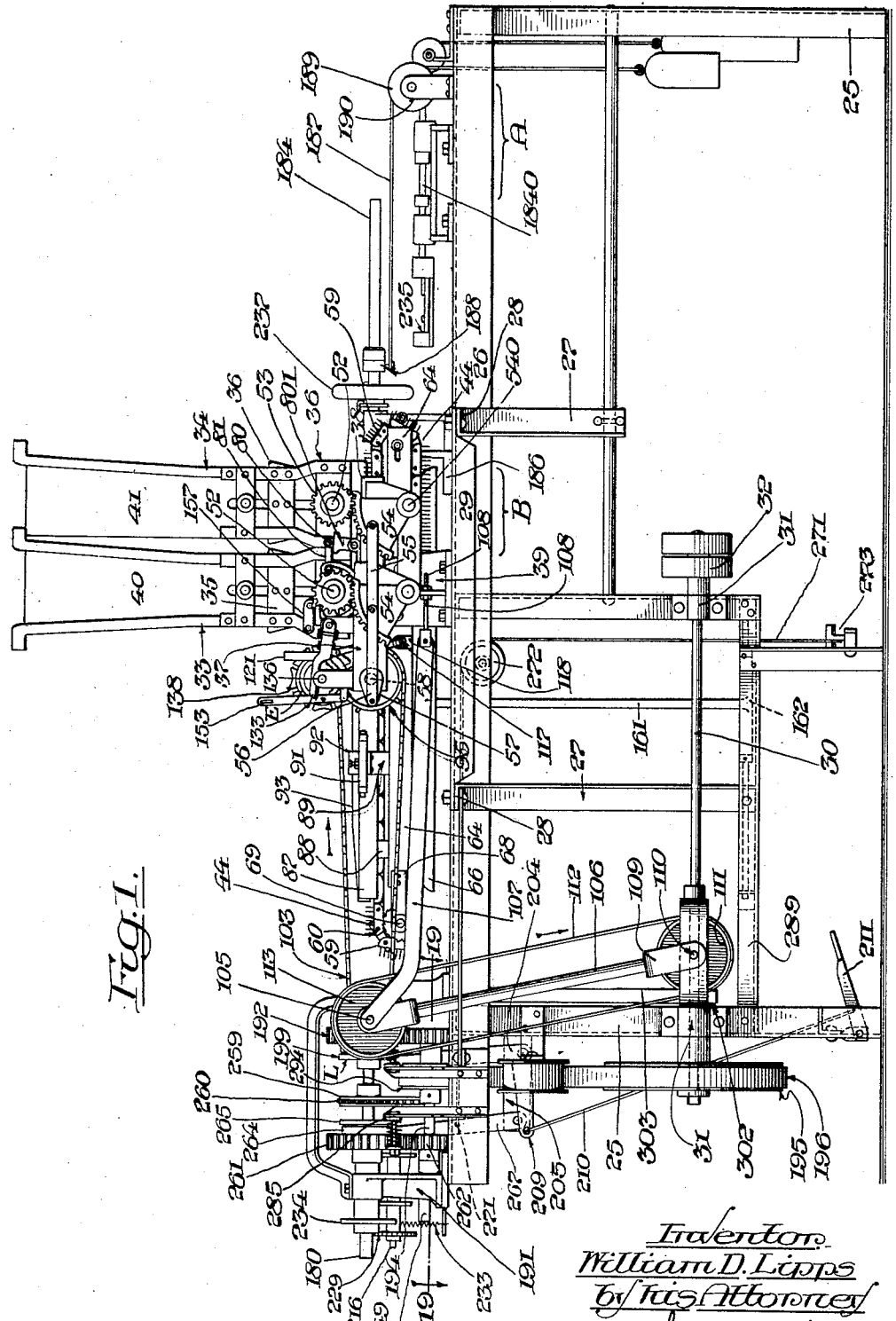

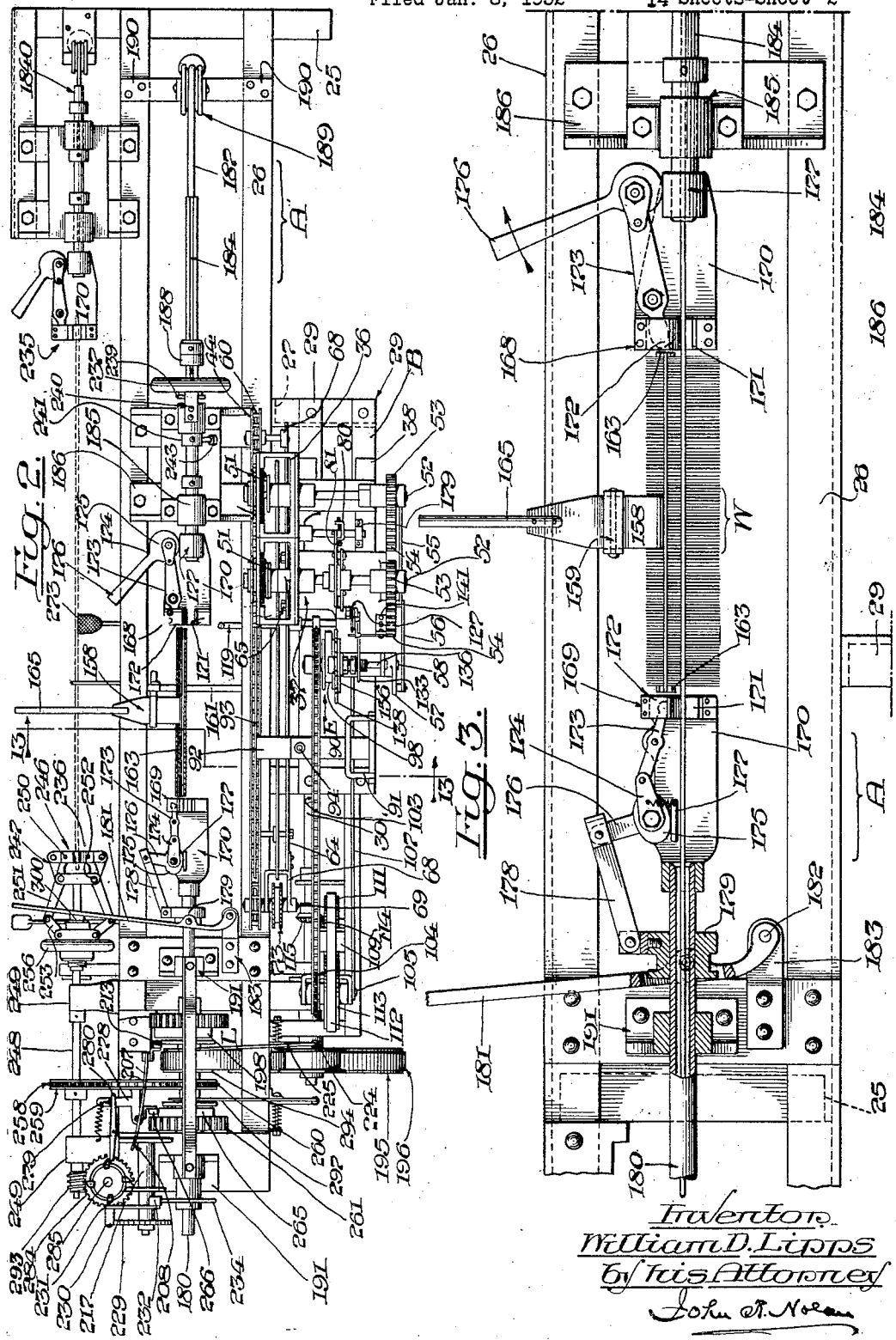

Nov. 22, 1932.  W. D. LIPPS  1,888,352
MACHINE FOR MAKING BRUSHES
Filed Jan. 8, 1932  14 Sheets-Sheet 4

Inventor
William D. Lipps
by his Attorney
John A. Nolan

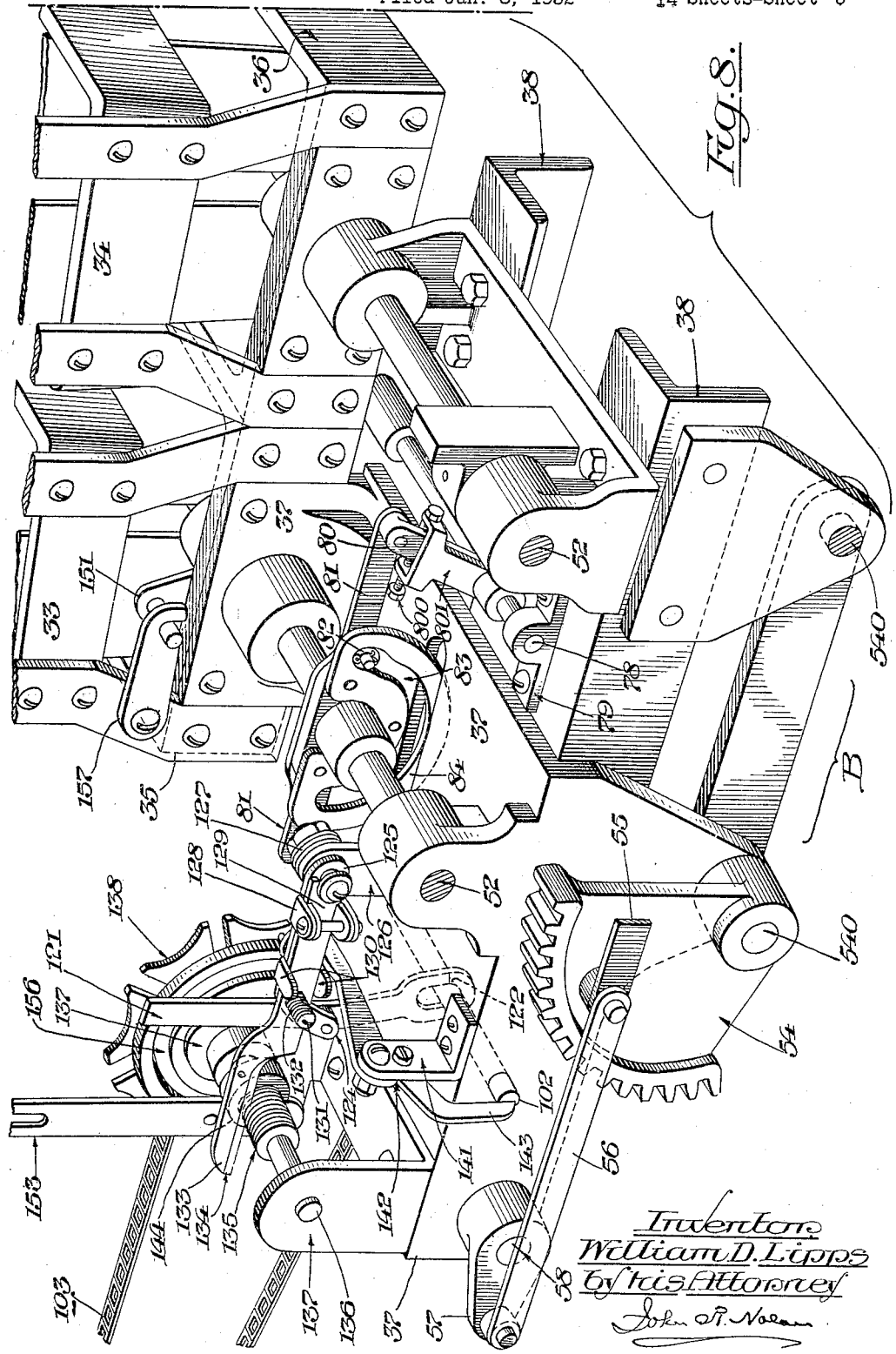

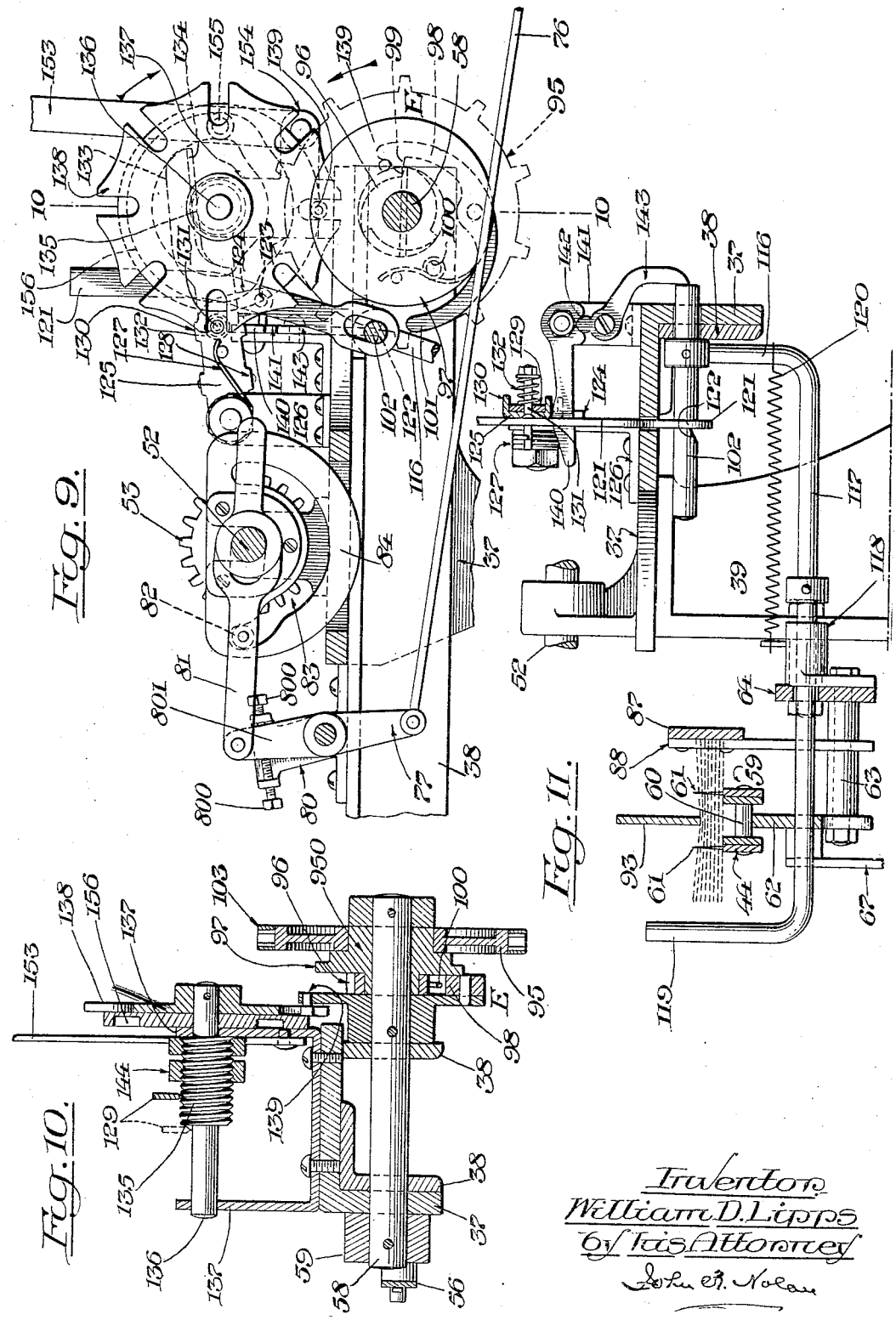

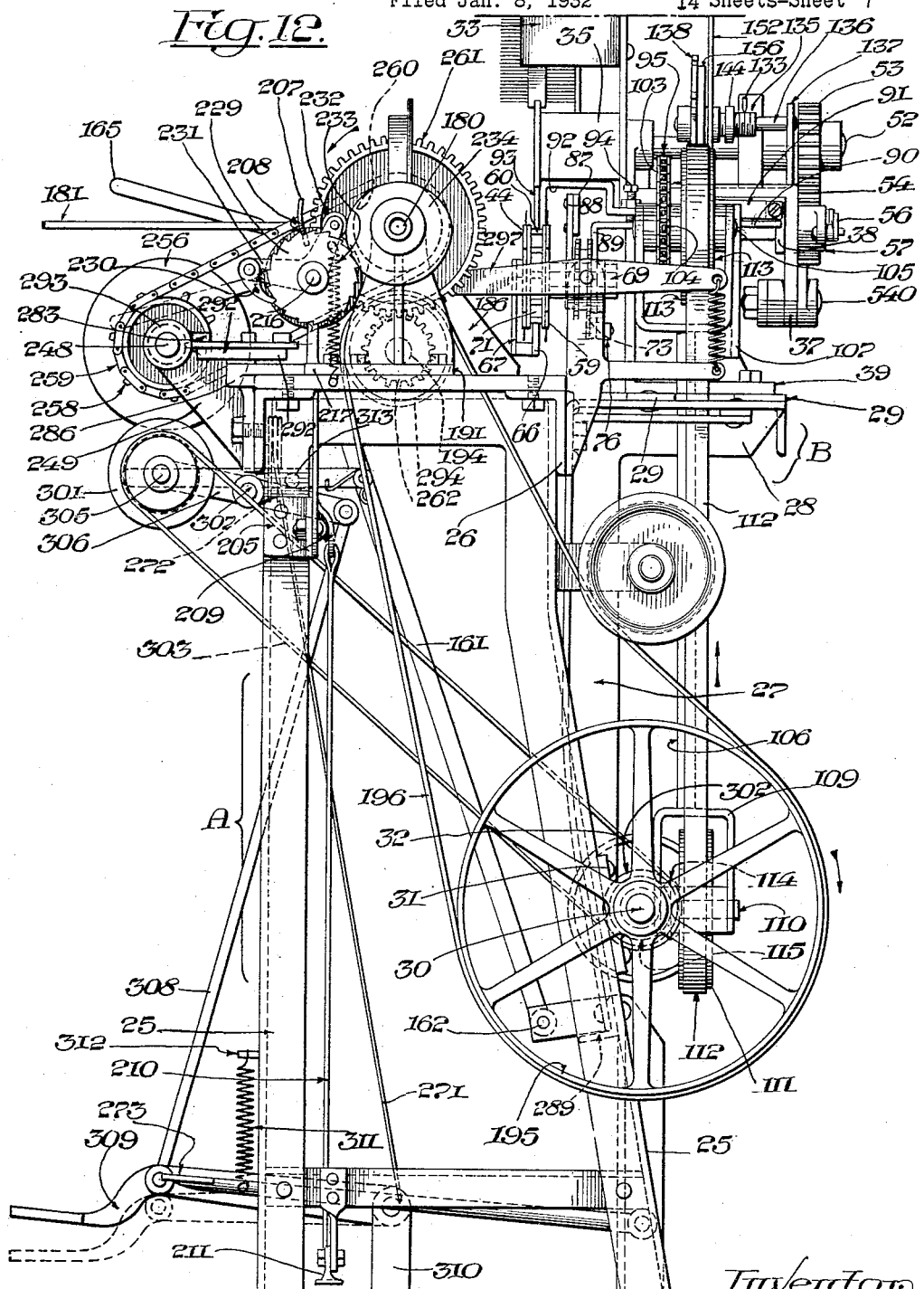

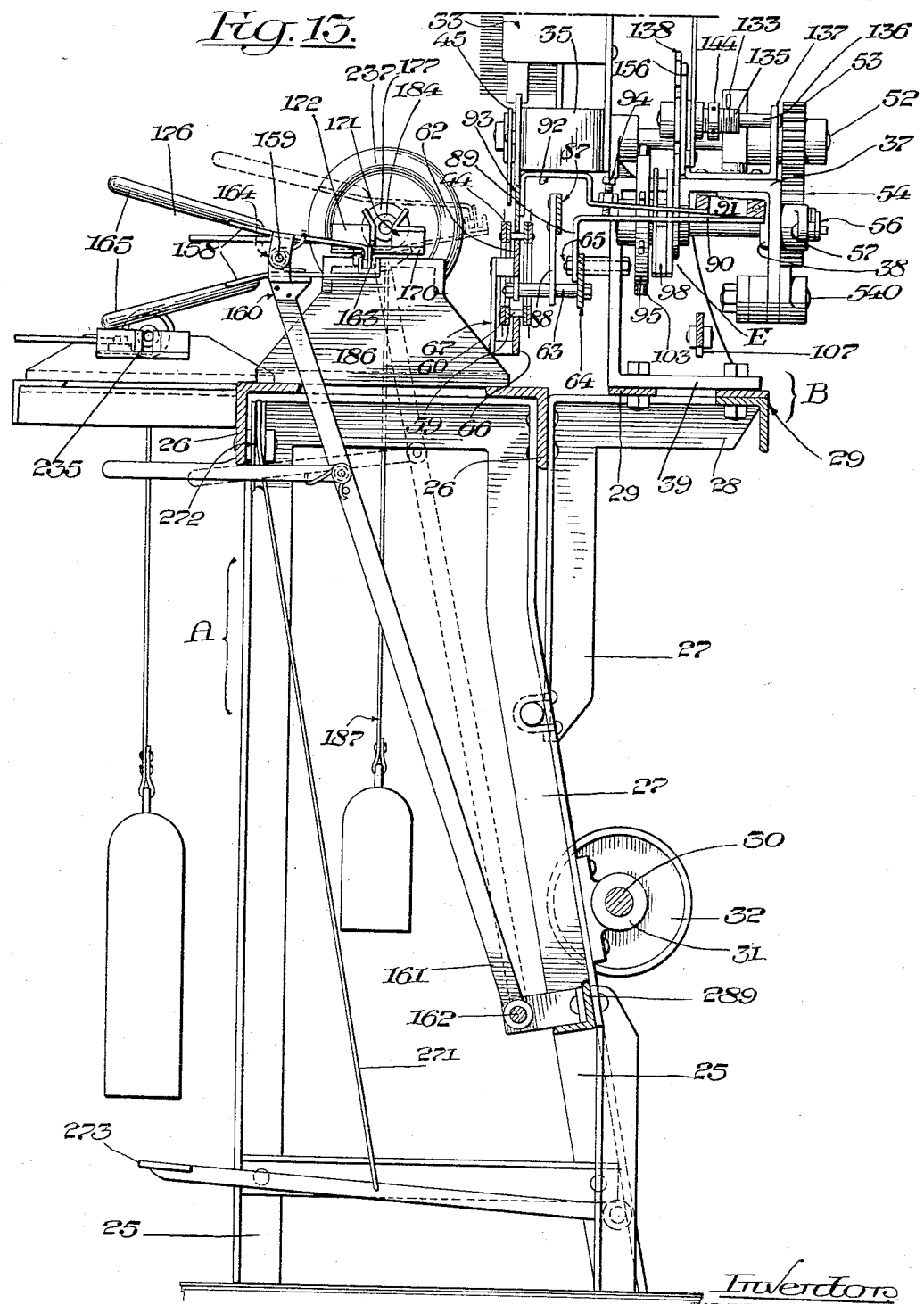

Nov. 22, 1932.  W. D. LIPPS  1,888,352
MACHINE FOR MAKING BRUSHES
Filed Jan. 8, 1932  14 Sheets-Sheet 9

Fig.14.

Inventor
William D. Lipps
by his Attorney
John P. Nolan

Nov. 22, 1932.   W. D. LIPPS   1,888,352
MACHINE FOR MAKING BRUSHES
Filed Jan. 8, 1932   14 Sheets-Sheet 10
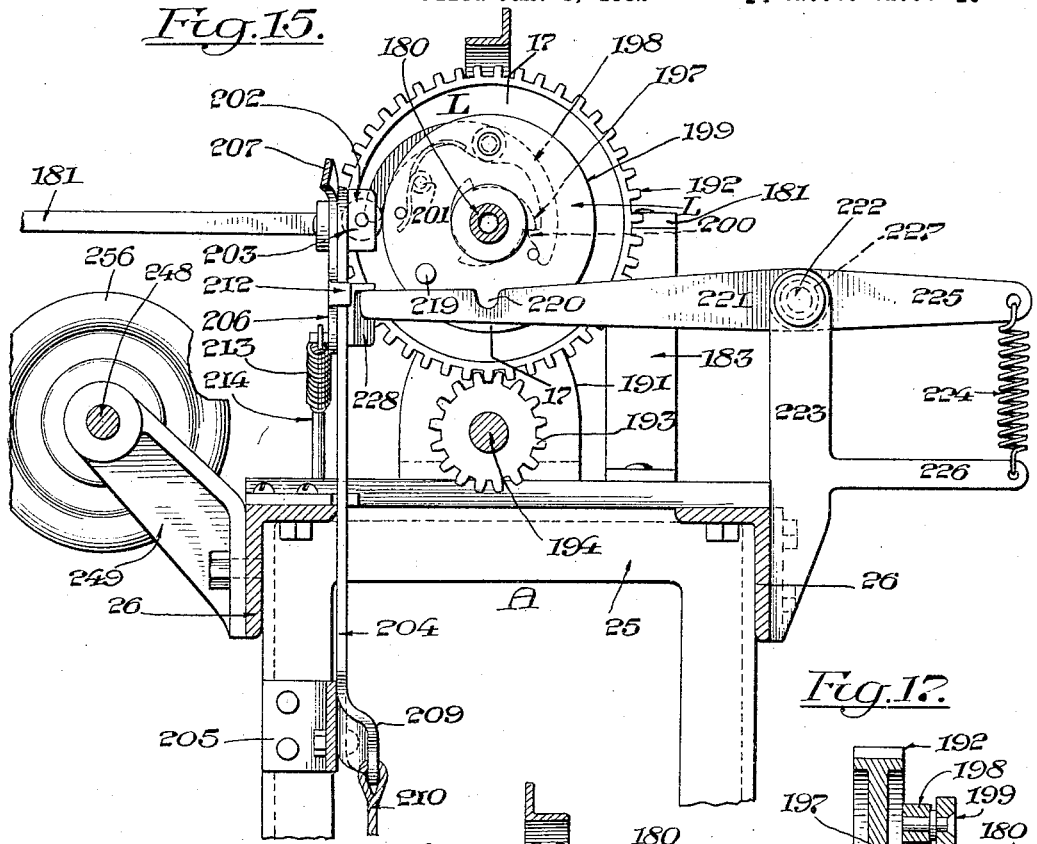
Fig. 15.
Fig. 17.
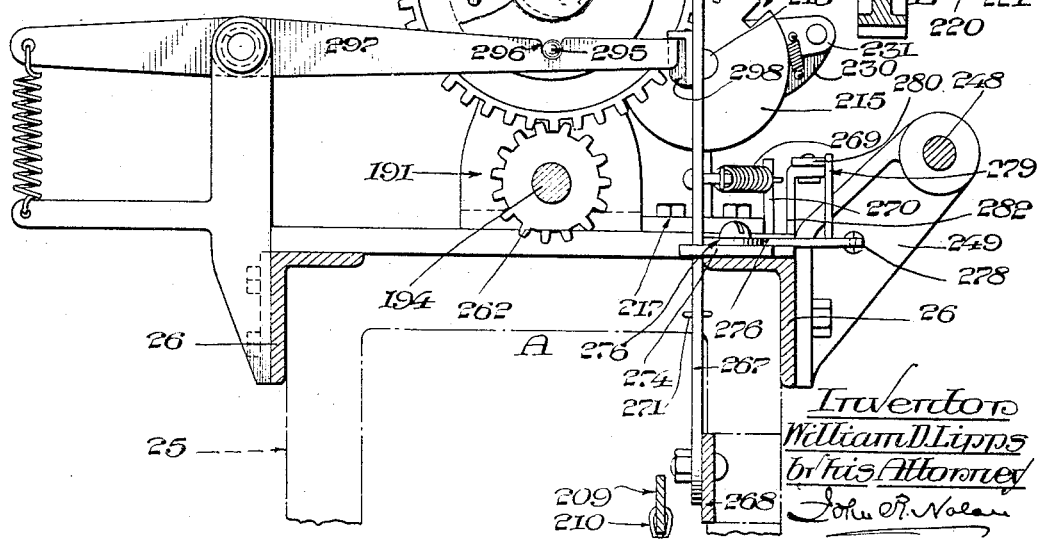
Fig. 16.
Inventor
William D. Lipps
by his Attorney
John R. Nolan Nov. 22, 1932.  W. D. LIPPS  1,888,352

MACHINE FOR MAKING BRUSHES

Filed Jan. 8, 1932  14 Sheets-Sheet 11

Inventor
William D. Lipps
by his Attorney
John R. Nolan

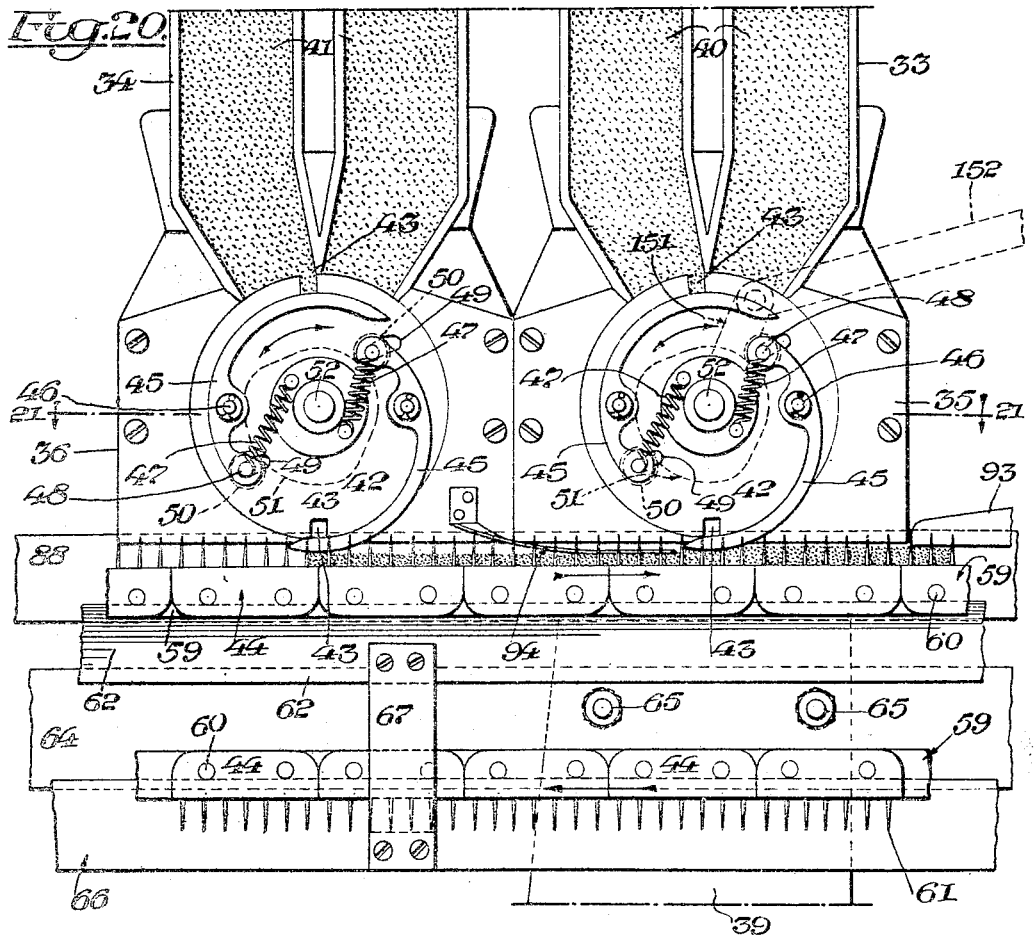
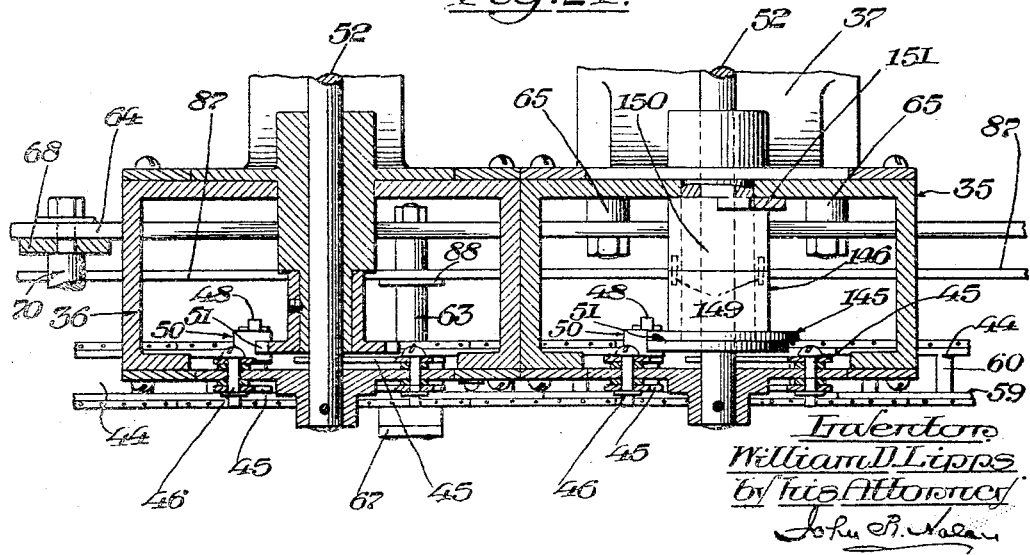

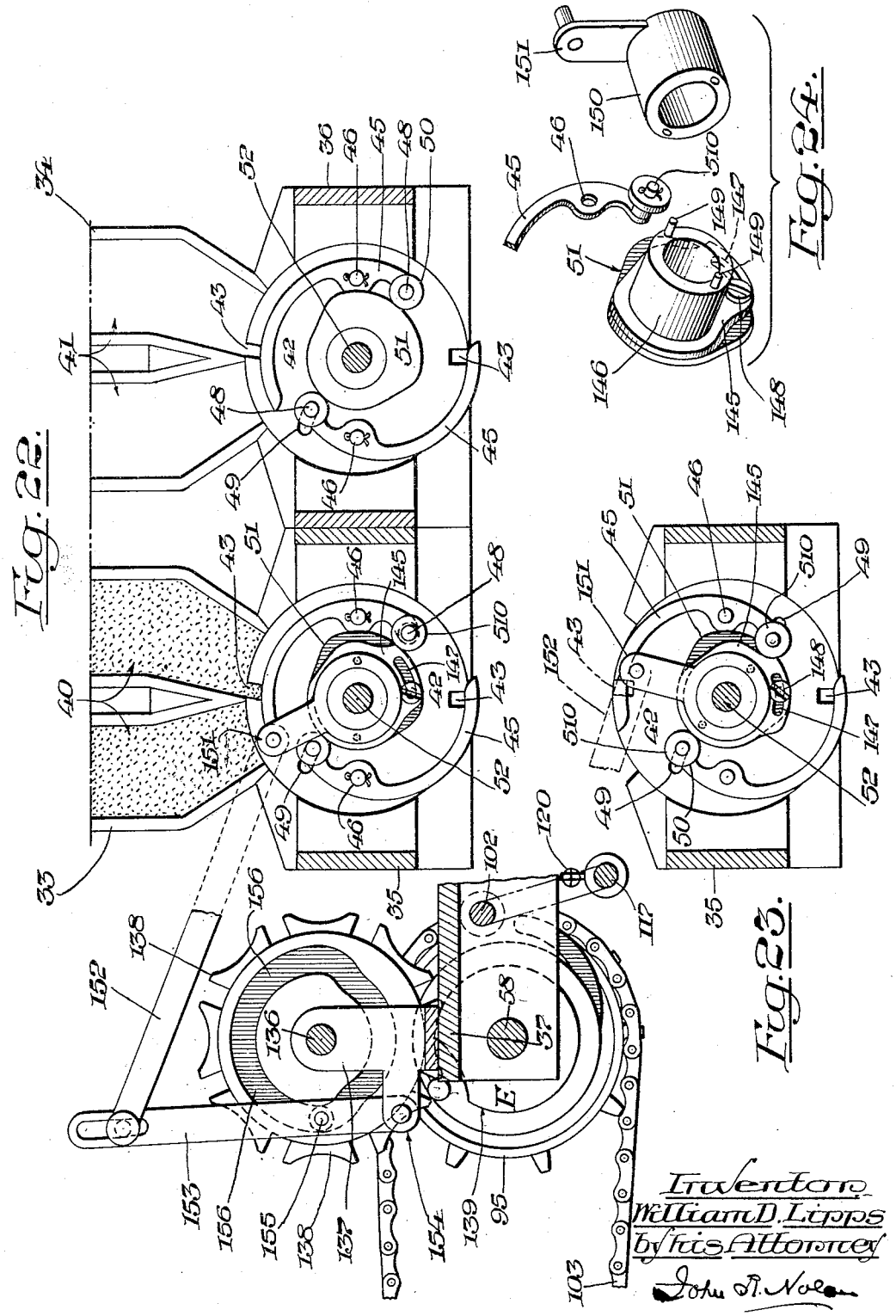

Nov. 22, 1932.  W. D. LIPPS  1,888,352
MACHINE FOR MAKING BRUSHES
Filed Jan. 8, 1932   14 Sheets-Sheet 14
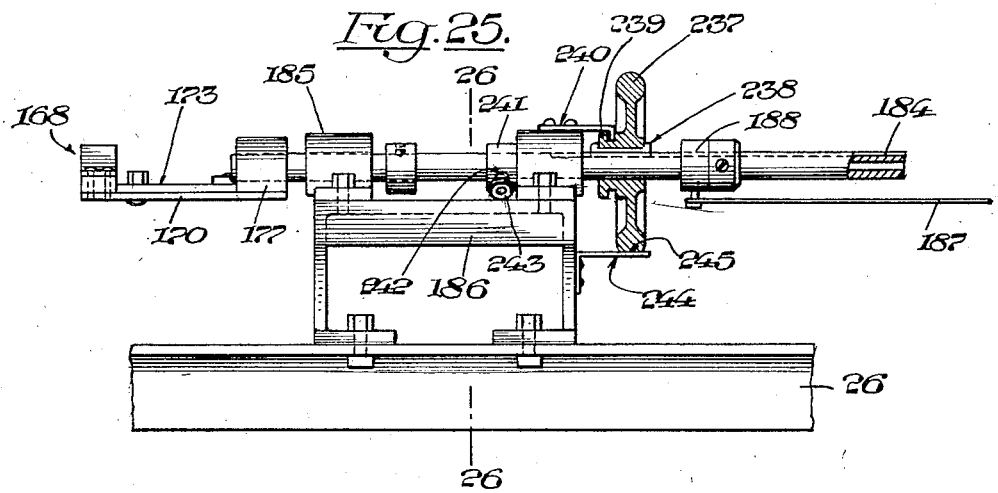
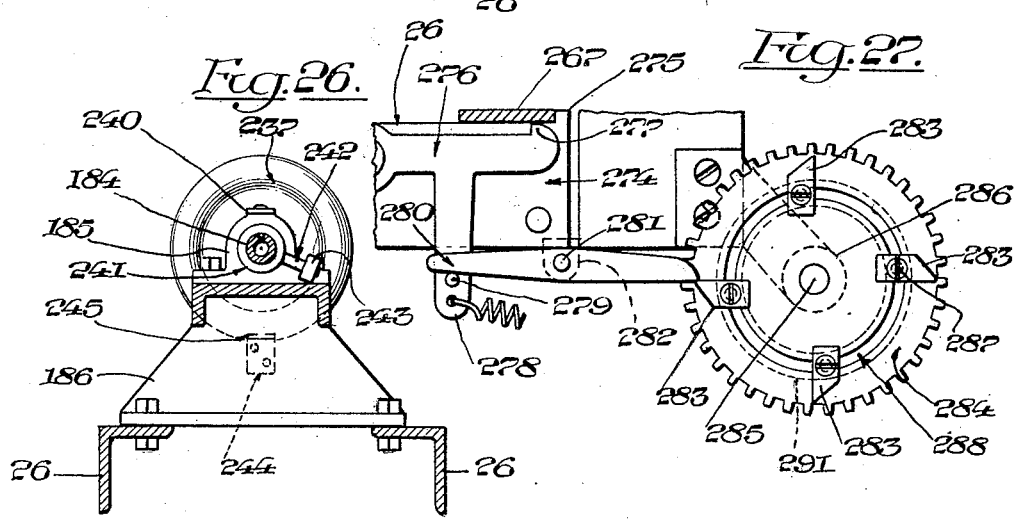
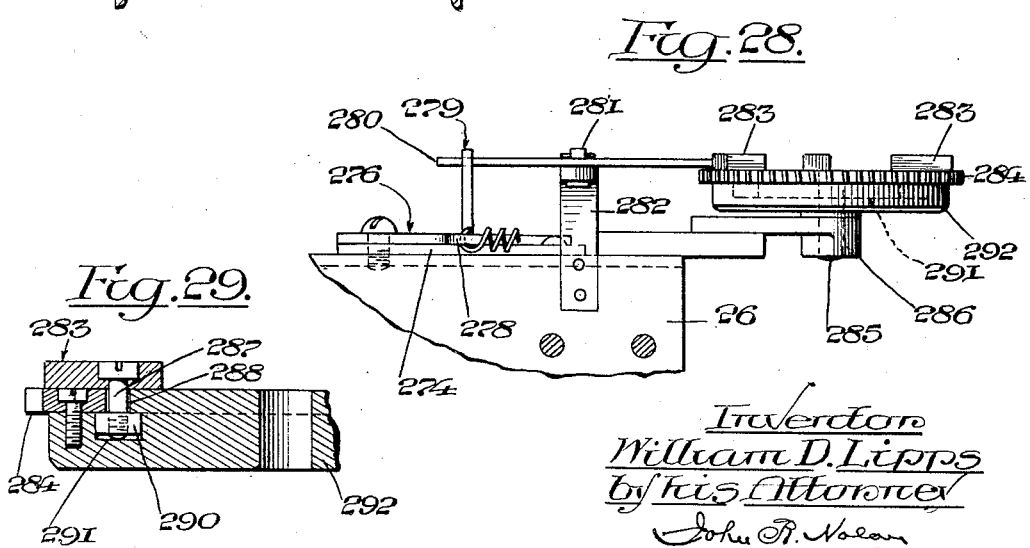
Inventor
William D. Lipps
by his Attorney
John R. Nolan Patented Nov. 22, 1932

1,888,352

UNITED STATES PATENT OFFICE

WILLIAM D. LIPPS, OF FREDERICK, MARYLAND, ASSIGNOR TO OX FIBRE BRUSH COMPANY, INC., OF NEW YORK, N. Y., A CORPORATION OF DELAWARE

MACHINE FOR MAKING BRUSHES

Application filed January 8, 1932. Serial No. 585,441.

This invention relates to machines for making brushes, more particularly brushes of the type whereof the fibres or bristles are associated with and supported by longitudinal core wires.

A machine of this kind is described in my co-pending application for Letters Patent of the United States filed June 20, 1930, under Serial No. 462,498, which machine embodies fibre-assembling and wire supporting and twisting mechanisms; means under the control of the operator whereby the fibres when assembled in a layer of suitable length can be accurately positioned with respect to the wires preparatory to the operation of the twisting mechanism; means whereby the said mechanisms are automatically stopped upon the completion of their respective operations in the making of a brush, and means under the control of the operator whereby the operations of said mechanisms can be resumed. The machine described in said co-pending application also includes provisions whereby a brush having fibres of one color or having fibres of alternately different colors can be produced.

The present invention may be generally described as an improvement or modification of the previous machine referred to whereby novel advantageous results in the construction and practical operation of the machine and in the products thereof, are secured.

An object of the invention is to provide a brush-making machine embodying mechanisms whereby the concurrent operations of feeding and assembling the bristles or fibres can be accurately accomplished with increased rapidity.

Another object is to provide a machine embodying mechanism whereby brush bodies of any predetermined length within limits can be produced.

Another object is to provide a machine embodying mechanism whereby a brush body having bristles or fibres of one or a series of two or more different colors can be produced at will.

Another object is to provide a machine embodying mechanism whereby a brush body having alternating rows of bristles or fibres of different colors and widths can be efficiently produced.

Another object is to provide a machine embodying main and supplemental core-wire twisting mechanisms arranged in co-operative relation, whereby brush bodies having end projecting twisted core wires can be produced in rapid succession.

With these and other objects in view my invention comprises features of novelty and combinations of parts which, in a preferred form, will be hereinafter described; the scope of the invention then being defined in the appended claims.

In the drawings—

Figure 1 is a rear elevation of the brush making machine embodying my improvements.

Fig. 2 is a plan of the machine.

Fig. 3 is a partial plan, enlarged, showing partly in section the wire supporting and main twisting mechanism, together with associated wires and bristles preparatory to the first twisting operation.

Fig. 4 is a partial rear elevation, enlarged, of the machine.

Fig. 5 is an elevation of one end of the fibre-assembling rack and its associated ratchet feed mechanism.

Fig. 6 is a horizontal section, as on the line 6—6 of Fig. 5.

Fig. 8 is a perspective view, partly in section, of the hopper structures and associated elements, including means for determining the length of the brush body.

Fig. 9 is a longitudinal vertical section, as on the line 9—9 of Fig. 7, showing a clutch-controlled shaft and co-operating elements for determining the periodic operation of the fibre feeding and assembling mechanisms.

Fig. 10 is a transverse vertical section, as on the line 10—10 of Fig. 9, showing the intermittently rotatable screw, and adjuncts, for determining the length of the brush body.

Fig. 11 is a transverse vertical section, as on the line 11—11 of Fig. 7, showing the fibre assembling rack and bolt and latch devices for controlling the operation of said rack and the fibre feeding mechanism.

Fig. 12 is an end elevation of the machine.

Fig. 13 is a transverse vertical section of the machine as on the line 13—13 of Fig. 2.

Fig. 14 is a partial rear elevation of the machine.

Fig. 15 is a transverse vertical section, as on the line 15—15 of Fig. 14, showing gear and clutch mechanism for the rotatable gripper spindle of the main twisting mechanism.

Fig. 16 is a similar section, as on the line 16—16 of Fig. 14, showing gear and clutch mechanism on the said spindle for controlling the operation of the rotatable spindle of the supplemental twisting mechanism.

Fig. 17 is a partial section through the clutch, and adjuncts, as on the line 17—17 of Fig. 15.

Fig. 20 is a front elevation of the fibre transfer heads and their associated hopper structures, showing the adjacent portion of the fibre assembling rack as supplied with fibres.

Fig. 21 is a horizontal section through the transfer heads and the supporting casings therefor and for the hopper structures, as on the line 21—21 of Fig. 20.

Figure 7:
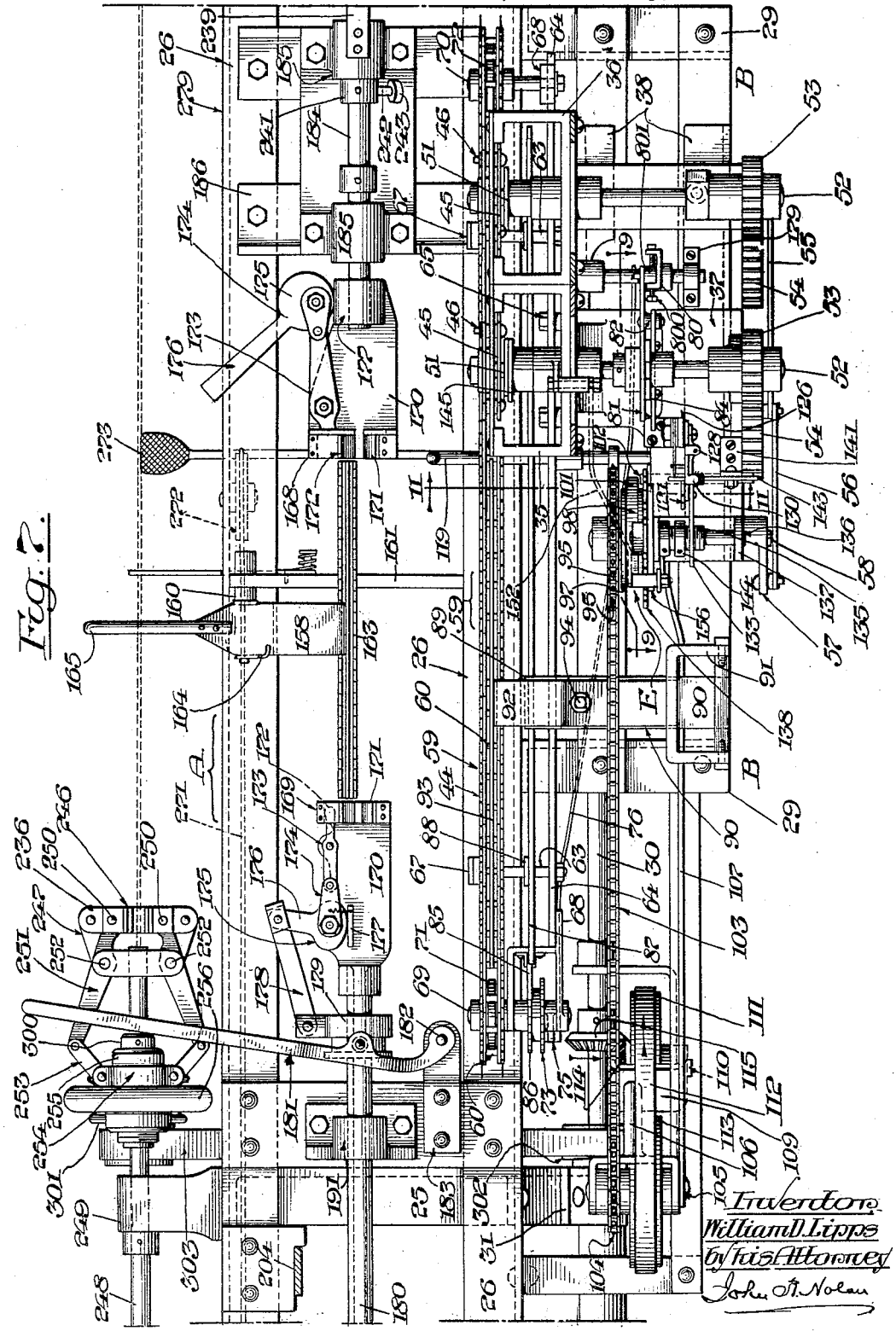
Fig. 7 is a plan of the mechanism shown in Fig. 4.

Fig. 22 is a longitudinal vertical section of the delivery portions of the hopper structures and their transfer heads, showing one of the structures equipped with a supplemental cam and associated mechanism for determining the operative positions of the control levers of the head during the making of so-called "spotted" brushes. In this view the cam is positioned to effect the removal of a succession of bunches of fibres from one of the compartments of the adjacent hopper structure.

Fig. 23 is a view of the transfer head showing the supplemental cam positioned to effect the removal of a single bunch of fibres from the other compartment of the said hopper structure.

Fig. 24 is a perspective view of the main and supplemental cams for actuating the control levers of the transfer head, showing the lever roll which is actuated by the supplemental cam, and also the crank for operating said cam.

Fig. 25 is a side elevation, partly in section, of the slidable gripper devices of the main twisting mechanism.

Fig. 26 is a transverse vertical section as on the line 26—26 of Fig. 25.

Fig. 27 is a plan of a tappet wheel and latch actuating lever for automatically controlling the operation of the clutch mechanism for the supplemental twisting mechanism.

Fig. 28 is a side elevation of the clutch controlling devices shown in Fig. 27.

Fig. 29 is a sectional detail of one side of the tappet wheel, showing an adjustable tappet thereon.

Referring to the drawings, A designates the main supporting frame including end standards 25 and spaced parallel top bars 26; and B designates a rearward frame extension situated between the ends of the main frame A. This rearward frame embodies spaced parallel uprights 27 having horizontal rear extensions 28 upon which are secured a pair of top bars 29.

30 designates a horizontal drive shaft which has its bearings in brackets 31 on the main frame, and is provided with a pulley 32 which is belted with and driven from a suitable source of power.

33, 34 designate two adjacent hopper structures supported on casings 35, 36, respectively, which are conveniently bolted together. One of these casings is secured to a bed bracket 37 which is mounted on a pair of parallel bars 38 supported by a standard 39 on the rearward frame B. Each of the hopper structures comprises two vertical bristle or fibre containing compartments 40, 41 having converging delivery portions with which cooperates an oscillatory transfer head 42 having suitably disposed diametrically opposite peripheral slots 43 effective to receive bunches of fibres from either or both of said compartments and transfer them to position for delivery to an intermittently movable assembling rack 44 of improved construction. In the previous machine a single hopper structure having two supply compartments was employed.

The transfer head of each hopper structure (33, 34) is similar in construction and operation to the head of the hopper structure described in my co-pending application Serial No. 462,498, excepting as hereinafter pointed out. Each of the transfer heads is fast on a transverse shaft 52 having its bearings in the walls of the supporting casing for the associated hopper structure. The head includes two pairs of curved control levers 45, the levers of each pair being arranged adjacent the respective sides of the disk and having a common pivot pin 46. The longer arms of the respective pairs of levers constitute fingers which extend adjacent the respective slots 43 of the transfer head and are urged outwardly beyond the slots by means of suitably disposed springs 47. A connecting pin 48 for the shorter arms of the levers passes through an arcuate slot 49 in the transfer head and carries a roll 50 into the path of which projects a stationary cam 51 of appropriate form to effect the timely operation of the fingers with respect to the slots 43 in a manner to permit the entry of the bristles or fibres into and ensure their discharge from the slots at proper intervals in the oscillation of the head with respect to the hopper structure and the assembling rack. (See Figs. 20, 21.)

On the shaft 52 of each of the transfer heads 42 is a pinion 53 with which meshes a gear sector 54 on a suitably-disposed stud shaft 540. The two sectors are connected by a detachable coupling link 55 and one of the sectors is operatively connected by a link 56 with a crank 57 on a transverse jack shaft 58 having its bearings in the bed bracket 37, whereby during the rotation of the shaft 58 the sectors are simultaneously operated. (See Figs. 4, 7 and 8.) This shaft 58 also controls the operation of the rack 44, and means are provided whereby said shaft is automatically stopped at the completion of the operations of feeding the fibres from the hoppers and assembling them in the rack, as will be hereinafter described.

By the use of two double hopper structures I am enabled to produce a brush body having bristles or fibres of one color or of two, three or four different colors, as desired.

In the case of a brush body having bristles of one color, either or both of the compartments of the hopper structure 33 are supplied with the bristles of the desired color, and the transfer head of the other hopper structure 34 is rendered inactive by disconnecting the coupling link 55.

In the case of a brush body having bristles or fibres of two colors arranged in corresponding alternating rows, the compartments of the hopper structure 33 are supplied with the respective bristles or fibres, and the transfer head of the other hopper structure 34 is rendered inactive as before. Where, however, the alternating rows of bristles or fibres are of different widths, as in so-called "spotted" brushes, the active transfer head and its levers 45 are operated in timed relation to the two compartments of the structure 33 to effect the delivery of proportionate quantities of bristles or fibres from the respective compartments to the assembling rack, as will presently appear.

In the case of a brush body having three different colors the bristles or fibres are omitted from one of the compartments and the transfer heads are simultaneously operated.

In the case of a brush body having bristles or fibres of four different colors, the compartments of both hopper structures are supplied with bristles of the respective colors, and the transfer heads are simultaneously actuated.

The fibre-assembling rack 44 embodies an intermittently movable endless chain of double links 59 which are connected by cross-pins 60 and are provided with rows of outwardly projecting sharpened pins 61 arranged in spaced relation throughout the length of the chain to provide a succession of corresponding spaces for the reception and retention of bunches of fibre extending transversely of the links. The chain is mounted and arranged above and longitudinally of the main frame in such manner that the upper horizontal run of the chain travels in a path directly beneath and at right angles to the axes of oscillation of the transfer heads.

In the present instance the upper run of the chain rack is supported practically throughout its length by a longitudinal rail 62 on which ride the cross-pins 60 of the links. This rail is secured by spacers 63 to an adjacent bar 64 extending in spaced parallel relation to the rail, which bar, in turn, is secured by bolts 65 to the bracket 39 that supports the hopper structures. The lower run of the chain is guided by a rail 66 which is supported by a pair of hangers 67 depending from the upper rail 62. At the respective ends of the bar 64 are brackets 68 having bearings for transverse shafts 69, 70 for wheels 71, 72, respectively, which support and guide the chain. The wheels 71, 72 are fast and loose respectively on their shafts 69, 70, the shaft 69 being intermittently driven so as correspondingly to actuate the chain. (See Figs. 4, 5, 6 and 13.) To this end the shaft 69 has fast thereon a ratchet wheel 73 with the teeth of which engages a pawl 74 on a rock-arm 75 loose on the shaft.

The arm 75 is connected by means of a rod 76 with one arm 77 of a rock lever loose on a shaft 78 which is supported in brackets 79 on the bars 38 adjacent the hopper structures. The other arm 80 of the lever is coupled by means of adjusting screws 800 with a rock arm 801 to which is pivoted one end of a longitudinally slotted reciprocating arm 81 through the slot of which the shaft 52 of the transfer wheel 42 for the hopper structure 33 freely extends. The slotted arm 81 is provided with a roll 82 which runs in the race 83 of a cam member 84 that is fixed to the said shaft 52, the cam race being suitably formed to effect the longitudinal reciprocation of the arm 81 at the end of each two oscillatory strokes of the shaft 52. The feed pawl 74 is actuated at the end of each alternate stroke of the transfer heads so as to position fibre receiving spaces of the chain rack beneath the discharge portions of the respective heads and maintain them thereat a sufficient interval of time for the reception of two bunches of fibre from each transfer head. A suitable back stop pawl 85 engages a ratchet 86 on the shaft 69. (Figs. 5 and 6.)

A longitudinal bar 87 which is supported in spaced parallel relation to the upper run of the chain rack by means of vertical pieces 88 secured to the adjacent spacers 63 between the rail 62 and bar 64, serves as a backer for the rear ends of the fibres carried by the rack, thus ensuring the uniform endwise arrangement of the succeeding bunches of fibres as the rack progresses. (Figs. 4, 11 and 13.)

The supporting bar 64 has secured thereto the vertical member 89 of an angular metal strip, whereof the horizontal member 90 has pivotally mounted at its free end a U-frame 91 supporting one end of a forwardly projecting arm 92. The free end of this arm has secured thereto a blade 93 that extends longitudinally of the upper run of the chain rack and rests upon the assembled fibres, thus settling the fibres in their respective spaces and preventing their displacement during the travel of the chain. The arm 92 has fitted thereto a set screw 94 which bears upon the underlying member 90 of the metal strip and affords a simple means whereby the upper arm can be readily raised or lowered to adjust the blade 93 with respect to the chain rack. (See Figs. 7, 11, 13 and 14.)

A spring strip 94 secured at one end to one of the hopper casings 36 bears upon the fibres first deposited in the rack as they progress to the second receiving position, thereby pressing down the first supply before the introduction of the additional supply to the rack. (See Fig. 20.)

When the upper run of the chain rack has received its quota of fibre for a brush body the shaft 58 is automatically stopped thereby checking the operation of the transfer heads and the chain feeding mechanism.

The mechanism for driving and controlling the operation of the shaft 58 is as follows:

Loose on the shaft 58 is an extended hub member 950 to which is affixed a continuously driven sprocket wheel 95 which is rendered active and inactive in respect to the shaft by means of a suitable clutch E including a ratchet 96 fast on the hub; a disk member 139 fast on the shaft, and a clutch lever pivoted to the disk. This lever comprises an arm 98 having a tooth 99 which is normally engaged with an opposing tooth of the ratchet by means of a spring 100 secured to the disk. The other arm 101 of the clutch lever projects beyond the periphery of the disk, and co-operates with a bolt member 102 which is projected into the path of the lever arm 101 when it is desired to unclutch the sprocket from the shaft 58 at the completion of the operations of feeding the fibres from the hopper compartments and assembling the fibres in the rack, thereby automatically stopping these operations while the assembled fibres are being transferred to the core wires, as will be hereinafter described. The hub is provided with a suitably disposed flange 97 which serves as a lateral guide and support for the clutch lever. The disk 139 is constructed to constitute the driver of a Geneva stop motion as will presently appear.

The sprocket wheel 95 corresponds with the pulley (74) of the previous machine and is likewise continuously driven, that is to say the sprocket wheel is connected by means of a chain 103 with a similar wheel 104 on a shaft 105. This shaft is mounted in the top of a vertical bar 106, which is yieldably held by means of a link 107 pivoted thereto and to an adjusting screw member 108 fitted to the bracket 39 adjacent the hopper structure. The lower end of the bar 106 is provided with a yoke 109 in the limbs of which a short shaft 110 is journaled. On this shaft 110 is a pulley 111 which is connected by a belt 112 with a pulley 113 fast on the upper shaft 105. The lower shaft 110 has fast thereon a bevel gear 114 which meshes with a similar gear 115 fast on the drive shaft 30. Hence the motion is transmitted from the drive shaft to the pulley 111 and its shaft 110 and thence through the belt 112 and pulley 113 to the shaft 105. (See Figs. 1, 4 and 12.)

The bolt member 102 previously referred to for co-operating with the clutch lever arm 98 is carried by the rearward up-standing arm 116 of a rod 117 which is slidably mounted in a bracket 118 on the stationary supporting bar 64, the forward end of the rod having a handle portion 119. A spring 120 secured to the arm 116 and to the bracket 118 tends to maintain the rod 117 in forward position with the bolt in the path of the tail of the clutch arm 101. The bolt extends through the slotted arm of a latch lever 121 which normally engages a notch 122 in the bolt when the bolt is pushed back from the path of the tail of the clutch lever arm. This latch lever is pivoted, as at 123, to a lug 124 on the free end of an arm 125 which is pivoted to a post 126 on the bed bracket 37, and a suitably disposed spring 127 bearing on a stud on the arm 125 tends to maintain such arm normally depressed. This arm has formed thereon adjacent its pivoted end a pair of laterally-extending lugs 128 between which is pivoted an arm 129. It is also formed with a pair of guide lugs 130 which embrace the arm 125. A screw pin 131 extends from the arm 125 through an orifice in the arm 129 and is encircled by a spring 132 which maintains the two arms yieldably in close relation. The arm 129 is formed with an extended portion 133 which when held in raised position supports the latch lever 121 in engaging relation with the bolt 102. When the arm 129 is released the latch lever is disengaged from the bolt and the latter is projected into the path of the tail of the clutch lever, thus unclutching the sprocket 95. (See Figs. 8, 9, 10 and 11.)

As a simple and efficient timing means to support the trip arm 129 and release it at prescribed intervals, depending upon the length of the brush body to be produced, the extended portion 133 of such arm is formed with a knife edge 134 adapted to overhang and engage the screw-threaded portion 135 of a transverse shaft 136 which is arranged above and parallel with the shaft 58. The shaft 136, which has its bearings in a suitably-disposed bracket 137, is operatively connected with the shaft 58, so that when the latter is driven the motion is transmitted to the screw shaft. In the present instance this screw shaft has fast thereon the driven member 138 of a Geneva stop motion, the driver whereof is constituted by the member 139 fast on the shaft 58, and therefore the screw shaft is intermittently actuated during the continuous motion of the shaft 58 in a manner to move the screw engaging portion 133 of the trip arm 129 toward the outer end of the screw against the lateral pressure of the spring 132. When the engaged knife portion escapes the screw-thread the arm 125, by virtue of the spring 127, forces the companion arm 129 downward, thus disengaging the latch lever 121 from the bolt 102 and permitting the latter to move into the path of the tail of the clutch lever arm 101, thereby checking the rotation of the shaft 58.

In order to reset the extension of the trip arm 129 on the screw during the manual operation of the rod 117 to retract the bolt 102 from the path of the clutch lever arm 101, a lifter lever 140 is pivoted to a post 141 on the bracket 37 so as to underlie the arms 125, 129. The pivoted end of this lifter lever is jointed at 142 to the shorter arm of a trigger lever 143 which depends in the path of the outer end of the bolt 102. When this bolt is unlatched and projected into the path of the clutch lever arm, the lifter arm 140 is depressed by the arms 125, 129 bearing thereon, thus causing the trigger lever to advance and bear against the opposing end of the bolt, and when the bolt is pushed to latching position it bears against the opposing trigger, thereby raising the lifter 140 and the arms 125, 129. When the end extension of the arm 129 clears the top of the screw, the spring 132 forces the arm along the top of the screw and resets it thereon for a succeeding operation in the production of a brush body.

The screw is provided with a nut 144 which serves as an adjustable stop to determine the initial position of the extension of the arm 129 on the screw as any particular length of brush body may require.

The mechanism hereinbefore referred to for effecting the variable operation of the transfer head 42 which is associated with the hopper structure 33 to produce a so-called "spotted" brush, that is a brush having alternating narrow and wide rows of bristles or fibres of different colors, is as follows, it being remembered that in that operation the transfer head which co-operates with the other hopper structure 34 is rendered inactive by disconnecting the coupling link 55 between the two gear sectors 54:

In addition to the regular cam 51 for actuating the levers 45 of the transfer head 42 for the hopper structure 33, a second cam 145 of different peripheral contour is provided. This cam 145 is formed with a hub 146 loosely mounted on the shaft 52 of the transfer head laterally adjacent the cam 51, so as to be movable relatively to the latter on the shaft as an axis. The cam 145 is provided with an arcuate guide slot 147 through which projects a pin or screw 148 from the cam 51. The hub 146 is connected by studs 149 at one end to the hub 150 of a crank 151 loose on the shaft 52, which crank is detachably connected by means of a link 152 with the upper end of an upstanding arm 153 that is pivoted at its lower end to a lug 154 on the bracket 137 in which the screw shaft 136 is journaled. The arm 153 is provided with a lateral roll 155 which engages the race of a face cam 156 fast on the adjacent side of the intermittently driven member 138 of the Geneva stop motion. The contour of the cam race is such that during the rotation of the Geneva member the crank 151 and therewith the cam 145 are oscillated to cause such cam at proper intervals to effect the opening and closing movements of the levers 45 in respect to the slots 43 of the transfer head, whereby the head receives and transfers a succession of bunches of fibre from one compartment and a single bunch from the other compartment.

Since the cam 156 operates on the levers 45 independently of the cam 51 it is necessary preparatory to the spotted brush operation, to remove the rolls 50 from the levers and substitute similar rolls 510 which are positioned on the shaft 52 to bear against the peripheries of the cam 156 during the oscillations of the transfer head. The cam 145 is shown in its respective limits of oscillation in Figs. 22 and 23.

As seen in Fig. 22 the contour of the actuating cam 156 is such that the cam 145 is maintained in a position to actuate the levers 42 in such timed relation to the oscillations of the transfer head that the head is active for a plurality of oscillations with respect to the compartment 40 and inactive with respect to the other compartment 41, but at the completion of the active oscillations of the head the cam 145 is shifted to the position shown in Fig. 23 wherein the head is active for a single oscillation with respect to the compartment 41. Thereupon the cam 145 is again shifted to occupy the position shown in Fig. 22, and so on, the result being that different quantities of fibres in alternation are transferred from the respective compartments of the hopper structure to the assembling rack as previously mentioned.

By changing the contour of the race of the face cam 156 the order of transfer of the fibres from the respective compartments can be varied to meet particular requirements.

In the making of a three or four color brush the two gear sectors 54 are connected by the link 55, the link 152 is disconnected, and the crank 151, together with the supplemental cam 145, is locked in inoperative position by means of a latch 157 pivoted to the side of the hopper structure, which latch engages the pivot link-pin on the crank. (See Figs. 4 and 8.)

In the making of the three color brush the bristles or fibres are omitted from one of the hopper compartments.

When the chain rack has been supplied with the requisite quantity of fibres for a brush body and the feeding and assembling operations have been temporarily stopped as hereinbefore described, the layer of fibres assembled in the rack is clamped at its forward end by a manually-operative gripper and pulled forward to cooperative relation with wire supporting and twisting mechanism through the instrumentality of which the associated wires and fibres are twisted to produce a cylindrical brush having an axial core of twisted wire.

The gripper mechanism herein illustrated is similar to that employed in my previous machine. It comprises a pair of clamping levers 158 (Figs. 2, 7, 12, 13) fulcrumed at 159 on a bracket 160 fixed on the upper end of a swinging supporting bar 161 which is pivoted at its lower end, as at 162, to a bracket on a lower bar 289 of the rear frame. The inner arms of the levers are provided with a pair of complementary clamping jaws 163 of suitable length to embrace the layer of fibre, which jaws are held normally in clamping relation by the action of a suitably-disposed spring 164 on the inner arms of the levers. The outer arms of the levers are formed with handles 165 to facilitate the manual operation of the levers, as follows: The operator firmly grasps the two handles and opens the jaws of the levers. He then swings the gripper toward the rack till its open jaws embrace the forwardly projecting portion of the layer of fibres, as indicated in dotted lines in Fig. 13. He then permits the jaws to grip the fibres, and swings the gripper, with the layer of clamped fibres, toward the front of the machine. The center of gravity of the load on the supporting bar 161 is forward of the pivoted end of the bar, and hence the upper end of such bar and the associated levers tend to swing outwardly.

The outward movement of the gripper is limited by the contact of the swinging bar 161 with the opposing front bar 26 of the main frame, such swinging bar having pivoted thereto a spring pressed latch which engages the lower edge of the frame bar 26 when the bar 161 and levers 158 are swung outward, as seen in Fig. 13.

Since the present machine is designed to make brushes whereof the core wires extend beyond one end or both ends of the brush body the wire supporting and twisting mechanism of the previous machine is modified in certain particulars.

As in that machine this mechanism includes a pair of grippers 168, 169 constructed and arranged to receive a pair of stout wires W and support them in parallelism longitudinally of the gripper members and in the space between the assembling rack and the outer position of the gripper, but in addition provision is had for the reception and support of one of the end extensions of the wire.

Each of the wire grippers 168, 169 comprises a base plate 170 having at its inner end a pair of complementary flared jaws whereof one (171) is fixed and the other (172) is movable in a guide on the base plate. The movable jaw is connected to one arm of a lever 173 which is fulcrumed on the base plate. The other arm of the lever is connected to a crank arm 174 fast on a cam head 175 having a projecting arm 176, which cam head coacts with an adjacent stop 177 on the base whereby when the arm 176 is properly manipulated the movable jaw can be closed and locked to grip the wire, or be unlocked to release the wire. The arm 176 of the cam head for the movable jaw of the gripper 169 is preferably connected by means of a link 178 with a sliding sleeve 179 splined on a horizontal hollow spindle 180 projecting from the base plate of the gripper 169. This sleeve is operatively connected to a hand lever 181 which is fulcrumed at 182 on a suitably-disposed bracket 183 on the main frame, whereby when the handle is properly moved the cam head is operated to close or open the movable jaw of the gripper 169.

The horizontal hollow spindle 180 has its bearings in spaced brackets 191 on the main frame. On the spindle is a gear 192 between which and the spindle is a suitable clutch L hereinafter described by means of which the gear can be rendered fast or loose on the spindle. This gear meshes with a pinion 193 fast on a lower parallel shaft 194 having its bearings in the brackets 191, which shaft bears a pulley 294 that is connected with and continuously driven from a pulley 195 on the main shaft 30 by means of a belt 196. (See Figs. 1, 12 and 14.)

The base plate 170 of the gripper 168 is affixed to one end of a horizontal spindle 184 having its bearings in spaced brackets 185, supported by a suitable supplemental frame 186 superposed on the main frame. The spindle 184, with its appurtenances, is normally urged in a direction toward the adjacent end of the main frame by means of a weighted cable 187. (See Figs. 1, 2, 3 and 7.)

The cable is secured to a collar 188 fast on the spindle 184 and passes about and depends from a pulley 189 mounted in brackets 190 on the main frame, the weight being secured to the pendant end of the cable.

On the spindle 184 is a hand wheel 237 by means of which the spindle can be partially turned manually when the fibres have been positioned between the core wires and the wires clamped at their ends by the respective grippers 168 and 169, thus partially twisting the wires and the interposed fibres to prevent the displacement of the fibres when the gripper 169 is initially rotated to twist the wires.

In the present instance the wheel 237 is slidably keyed on the spindle 184, as at 238, and is provided with a peripherally grooved hub 239 with which freely engages the depending member of an angle piece 240 secured to the adjacent bearing bracket 185. Thus the hand wheel can be manipulated initially to turn the spindle 184, yet permit the longitudinal movement of the latter during the twisting operation. The spindle 184 has secured thereto a collar 241 having a radial stud 242 provided at its extremity with a roller 243 which, impinging against the top of the frame 186 at the respective sides of the spindle 184, limits the range of rotative movement of the spindle preparatory to the main twisting operation. The wheel 237 is locked in position during this operation by means of a spring latch 244 which is secured to the adjacent part of the supplemental frame 186 so as to engage a suitably located peripheral notch 245 in the wheel. (See Figs. 1, 2, 25 and 26.)

The clutch L hereinbefore referred to includes a ratchet member 197 fast on the hub of the gear 192, and a clutch lever 198 pivoted on a disk 199 fast on the spindle adjacent the ratchet member. The shorter arm of the clutch lever is provided with a tooth 200 which is normally held in engagement with an opposing tooth of the ratchet by means of a spring 201 which is secured to the disk and arranged to press against the longer arm of the lever.

The free end of the longer arm of the lever projects beyond the periphery of the disk and is adapted, when the gear 192 has made a predetermined number of rotations, to encounter a roll 202 which is arranged and adapted to be moved laterally into the path of the projecting lever arm in a manner to disengage the clutch lever from the ratchet member 197, thus unclutching the gear 192 from the spindle 180.

The roll 202 is mounted on a laterally projecting lug 203 adjacent the upper end of the vertical arm 204 of a bell-crank which is pivoted at its lower end on a bracket 205 at one side of the main frame. Pivoted on the upper end of the arm 204 is the depending member 206 of a longitudinally-disposed latch arm 207 at the free end of which is a beveled tooth portion 208.

The horizontal arm 209 of the bell-crank is connected by means of a cable 210 to a treadle 211 suitably located at the bottom of the main frame.

The depending member 206 of the latch arm 207 has a suitably-disposed lug or projection 212 which, when the member is moved toward the clutch by the action of a suitable spring 213 connecting such member with a pin 214 on the main frame, abuts against the vertical arm 204 of the bell-crank, thus similarly moving the arm and shifting the roll 202 thereon into the path of the clutch lever 198. The roll is latched in retracted position upon the periphery of the disk 199, against the force of the spring 213, by the engagement of the latch tooth 208 with the peripheral edge of an intermittently rotatable latch disk 215 fast on one end of a short horizontal shaft 216 having its bearing in a bracket 217 on the main frame. This disk has in its periphery a radial notch 218 so disposed that when the disk in its intermittent travel makes a complete rotation, the notch aligns with the tooth of the latch arm, thus freeing the arm and permitting its instant projection by the action of the spring 213, the roll being moved into the path of the clutch lever to effect the release of the rotating gear.

When it is desired to remove the roll from the path of the clutch lever 198 and permit the re-engagement of the lever with the complementary clutch member 197 on the gear 192, the treadle 211 is depressed, thus moving the latch arm toward and into engagement with the periphery of the latch disk 215.

To prevent rotation of the spindle 180 and retain the gripper 169 in proper wire-receiving position when the gear 192 is unclutched, the hub of the clutch disk 199 is provided with a laterally-projecting stud 219 adapted to engage a suitably-disposed notch 220 in the longer arm 221 of a horizontal lever which is pivoted, as at 222, on a post 223 on the main frame. A spring 224 connecting the shorter arm 225 of the lever with a rearwardly projecting member 226 on the post 223, maintains the longer arm normally raised, so that as the gear 192 approaches the limit of its rotation the stud rides upon and depresses the arm 221 until the stud 219 reaches the notch, whereupon the arm 221 snaps upward and engages its notch with the stud. (See Fig. 15.)

Figure 18:
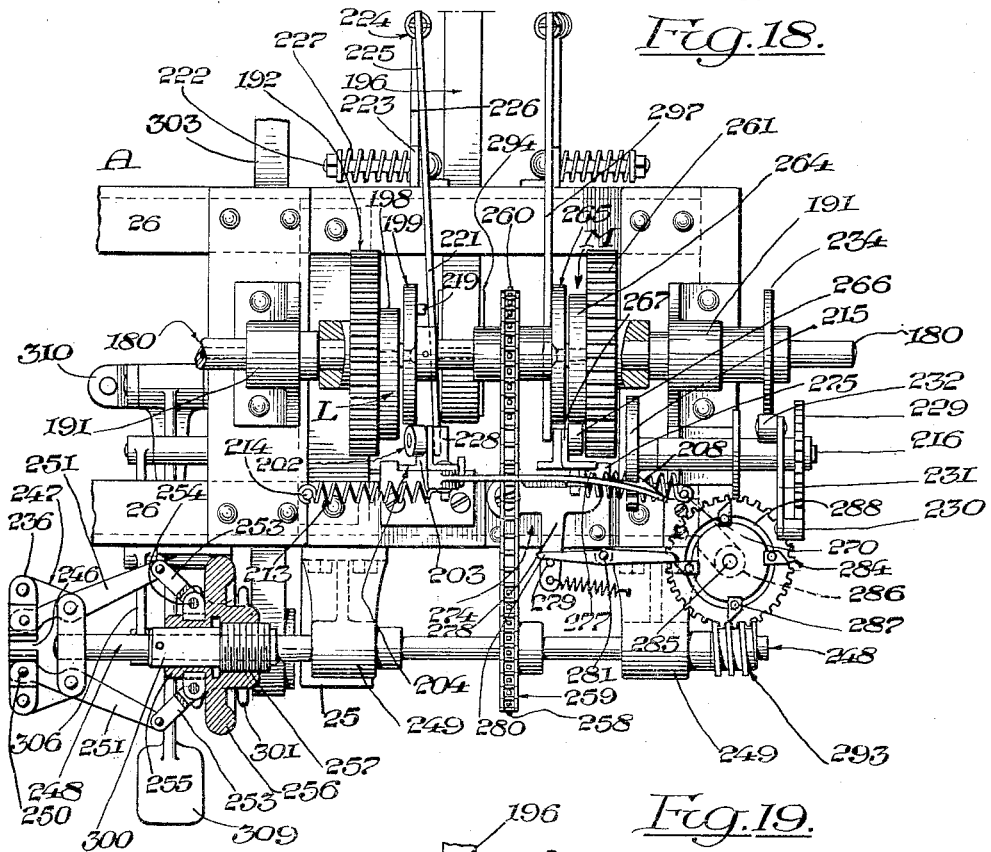
Fig. 18 is a partial plan of one end of the machine, showing the mechanisms for operating the main and supplemental gripper spindles.
Figure 19:
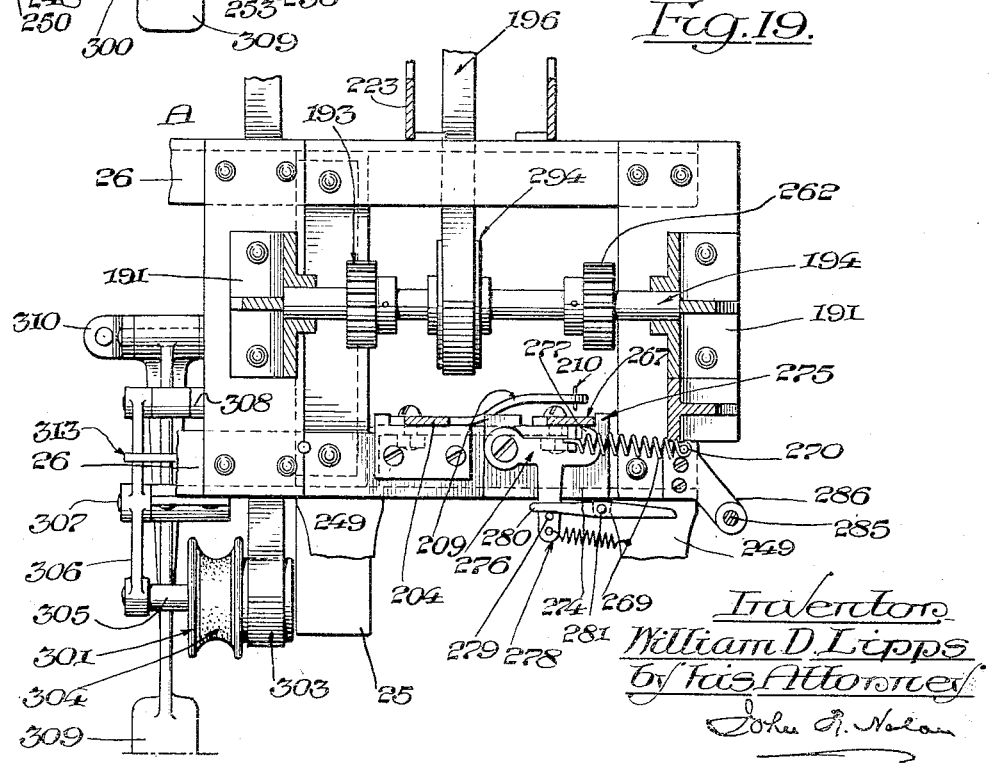
Fig. 19 is a horizontal section, as on the line 19—19 of Fig. 1, showing a continuously driven shaft and its gears for operating the said gripper spindles, and also showing controlling devices for the clutches on the main gripper spindle.

The pivot pin 222 for the notched lever is extended, as seen most clearly in Fig. 18, and a spring 227 is interposed between the head of the pin and the opposing side of the lever, thus permitting resilient lateral movement of the lever. The longer arm of the lever extends laterally adjacent a lug 228 on the vertical arm 204 of the bell-crank, and hence when the bell-crank is actuated to effect the removal of the roll 202 from the path of the clutch lever 198 and coincidentally engage the latch tooth 208 with the periphery of the latch disk 215, the lug 228 presses the opposing lever arm 221 laterally, thus disengaging the retaining notch 220 of the arm from the stud 219 on the disk 199.

The means for intermittently actuating the latch disk 215 in timed relation to the twisting cycle is similar to that employed in my previous machine, as follows:

Fast on the outer end of the shaft 216 is a ratchet wheel 229 having a prescribed number of equally-spaced teeth, with which is adapted to engage a spring-pressed pawl 230 on one arm of a bell crank-lever 231 loose on the shaft 216. On the other arm of the lever 231 is a roll 232 which is held by means of a suitably-disposed spring 233 (Figs. 12, 14) in operative contact with a cam 234 fast on the spindle 180, the peripheral contour of the cam being such that in each rotation of the spindle 180 the pawl lever 231 is oscillated in a manner to advance the ratchet wheel a distance of one tooth, thus correspondingly moving the shaft 216 and the latch disk 215. Assuming the latch arm 207 be engaged with the latch disk and the gear 192 clutched to the spindle 180, such gear and the shaft will make one complete rotation during each step of the latch disk, and hence the number of steps of the latch disk before its notch 218 registers with and effects the release of the tooth of the latch arm 207 will determine the number of rotations of the gear 192 and its spindle 180 to which the ratchet disk 199 of the clutch L is secured.

During the fibre assembling operation, the operator places a wire W in the respective wire grippers 168, 169, advances the fibre gripper to position the layer of fibres on the wire, and places upon the layer another wire which is seated in the wire grippers. He then closes and locks the wire grippers on the wires. He then opens the fibre gripper jaws and permits the fibre gripper to assume its outward position. He then partially turns the hand wheel 237, thus similarly turning the spindle 184 and the wire gripper 168, so as partially to twist the wires and the interposed layer of fibres. He then presses on the treadle 211, thereby actuating the bell crank 204, 209 and effecting the engagement of the tooth of the latch arm 207 with the intermittently-rotating latch disk 215, and coincidentally moving the roll 202 out of the path of the lever 198 of the clutch L, thus connecting the continuously rotating gear 192 to the spindle 180. Consequently the rotation of the spindle and its wire gripper 169 is commenced and continued until the latch arm 207 is released at the notch of the disk 215, as previously explained.

Upon the stopping of the rotating spindle and its gripper, the operator removes the brush from the wire grippers. At this juncture the assembling rack has been fully supplied with fibres, and the operations of the rack and the fibre transfer wheels are automatically stopped, as previously described. This done, the operator again manipulates the fibre gripper to withdraw the new layer of fibres from the rack, and proceeds as before for the production of another brush, and so on.

In the production of a brush wherein the core wires project a short distance beyond the respective ends of the brush body, the ends of the wires which embrace the layer of fibres are seated and clamped in the respective wire grippers and the twisting of the wires throughout their length is effected initially by the partial rotation of the gripper 168 and then by the continuous rotation of the gripper 169 as hereinbefore described.

In the case of a brush wherein the core wires project a substantial distance beyond either or both ends of the brush body, to form a long tang or tangs, the operator enters one end of the wires in the tubular spindle 180 a suitable distance and properly positions the opposite end of the wires in the wire gripper 168 as determined by the desired length of the projecting tang. Hence when the wires are clamped by the wire grippers and the gripper 169 is rotated, the portions of the wires between the grippers containing the layer of fibres are tightly twisted, while the projecting end portions of the wires remain untwisted.

Means to effect the twisting of the projecting ends of the core wires is as follows:

235, 236 designate two supplemental grippers which are located at the front of the machine, in spaced endwise relation, to receive and grip the extremities of the untwisted extensions of the wire core.

The wire gripper 235 and its supporting parts, together with the weighted cable connection, are similar in all respects to the gripper 168 previously described, excepting that the spindle 1840, corresponding to the spindle 184, is simply splined in its bearings to permit its longitudinal movement only, and the hand wheel is therefore omitted.

The wire gripper 236 comprises a pair of complementary jaws 246 slidably mounted on a plate 247 fast on the adjacent end of a longitudinal spindle 248 having its bearings in brackets 249 on the front of the main frame. These jaws are jointed, as at 250, to the shorter arms of a pair of diverging levers 251 which are fulcrumed, as at 252, on the plate 247, the longer arms of the levers being connected by means of links 253 with a yoke 254 which is rotatably supported on the hub portion 255 of a hand wheel 256. This wheel is threaded, as at 257, on a sleeve 300 fast on the spindle, and hence when the wheel is rotated it travels on the sleeve to the right or left, according to the direction of rotation of the wheel, thereby correspondingly advancing or retracting the yoke in a manner to actuate the levers 251 to close or open the jaws 246, thus gripping or releasing the ends of the wires as desired. The rounded periphery of the hand wheel is adapted to be engaged by the groove of a pulley 301 which is connected with and continuously driven from a pulley 302 on the main shaft 30 by means of a belt 303. The wall of the pulley groove is preferably lined with frictional material, such as leather 304. The pulley 301 is slidably mounted on a stud shaft 305 supported on one arm of a lever 306 which is fulcrumed, as at 307, on the front of the main frame, the other arm of the lever being connected by means of a link 308 with a treadle 309, which is pivoted on a suitably disposed floor bracket 310. A spring 311 connected at its ends to the treadle and to a stud 312 on the main frame maintains the treadle normally raised and the pulley 301 out of operative engagement with the hand wheel 256. A suitably-disposed stop 313 against which the lever abuts limits the downward movement of the pulley 301. (See Figs. 2, 12, 18 and 19.)

By depressing the pedal 309 the pulley 301 is raised into frictional contact with the periphery of the hand wheel 256, thus rotating the wheel in a manner to advance it a sufficient distance on the threaded sleeve 300 to close the jaws 246 and grip the ends of the associated wires. The pulley being slidable on its shaft advances with the hand wheel. This done, the pedal is released, and the drive pulley 301 is withdrawn from contact with the wheel 256 and idly rotates, whereupon the spindle 248 and the gripper are rotated by mechanism hereinafter described in a manner to effect the final twisting of the ends of the wires. Immediately upon the termination of this twisting operation the rotation of the spindle is stopped, and the abruptness of the stoppage releases the hand wheel on the threaded sleeve, thus causing the jaws to open and free the gripped end of the wires. The operator then manually turns the hand wheel 256 to its original position so as to open the jaws 246 for the reception of the wires in the next end twisting operation.

The spindle 248 is provided with a sprocket 258 fast thereon, which sprocket is connected by means of a chain 259 with a sprocket 260 loose on the hollow spindle 180 which carries the wire gripper 169. By means of suitable clutch mechanism M the sprocket 260 may be rendered fast or loose on a gear 261 loose on the spindle 180, which gear meshes with and is continuously driven by a pinion 262 fast on the shaft 194.

The clutch mechanism herein shown in substantially similar in construction and operation to the clutch mechanism L previously described. Fast on the hub of the gear 261 is a ratchet member 263 with which is adapted to engage the toothed end of a spring-pressed clutch lever 264 that is pivoted on a disk 265 carried by and turning with the sprocket 260. The roll 266 for disengaging the clutch lever is mounted on the upper end of a rock arm 267 the lower end of which is pivoted on the bracket 205 adjacent the bell-crank lever 204. A spring connection 269 between the arm and a pin 270 on the main frame tends to maintain the arm in position with the roll in the path of the clutch lever. A cable 271 passing about a suitably-disposed sheave 272 on the main frame connects the arm 267 with a threadle 273 mounted on a lower extension of the frame. (See Figs. 1, 2, 12, 14 and 16.) When the treadle is depressed the roll 266 is swung from the clutch lever against the action of the spring and rests on the face of the disk, the lever thus engaging the ratchet and locking the gear 261 to the disk 265 and sprocket 260. Hence the sprocket is rotated and the motion is transmitted to the spindle 248. The lever is latched in this position until the final twisting operation has been completed, whereupon the lever is released and moved to position the roll in the path of the clutch lever in order to disconnect the gear 261 from the spindle 180 and thus stop the rotation of the spindle 248 and its wire gripper; it being remembered that such stopping automatically releases the hand wheel 256 on the threaded sleeve 300 of the spindle 248 and effects the opening of the gripper jaws 246 and the release of the twisted ends of the core wires gripped thereby.

The lever latching mechanism is as follows: 274 is a plate which is fixed to the main frame adjacent the rock arm 267 and is provided at one end with a shoulder 275 which affords a stop for such arm when it is in clutch-lever engaging position. Pivoted on the opposite end of the plate is a spring controlled latch lever 276 having a shoulder 277 which is moved into engagement with the arm 267 when the latter is swung to clutch-lever releasing position by actuation of the treadle 273, thus temporarily locking the arm in that position. (See Figs. 14, 16, 18 and 19.) When the final end twisting operation is completed the latch-lever 276 is automatically disengaged from the arm 267 as follows:

The latch lever has an outwardly projecting arm 278 provided with an upstanding stud 279 against which bears one arm of a lever 280 which is fulcrumed, as at 281, on a bracket 282 at the front of the main frame.

The other arm of the lever extends into the path of a series of spaced tappets 283 on the face of a horizontally disposed worm wheel 284 which is loosely mounted on a stud shaft 285 projecting from a bracket 286 on the top of the main frame. The tappets are independently adjustable relatively to each other, and to this end each tappet is firmly clamped against the face of the worm wheel by means of a screw 287 which passes through an annular opening 288 in the wheel and is threaded in a block 290 seated in an annular groove 291 in a backer wheel 292 to which the worm wheel is fastened. (See Figs. 17, 18, 28 and 29.)

The worm wheel 284 meshes with a worm 293 on the outer end of the spindle 248, and hence the wheel is moved with the spindle during the end twisting operation. The tappets are so disposed that at the end of each twisting operation a tappet bears against the opposing arm of the lever 280 and forces it inward. As the other arm is swung outward it bears against the stud 279 on the arm 278 of the latch lever 276 and moves the latch to release the rock arm 267, which arm swings laterally against the stop 275 on the plate 274, for the purpose previously described. The tappets 283 are in such spaced relation on the worm wheel as to act consecutively upon the lever 280 at the termination of each succeeding end twisting operation.

To prevent rotation of the gear 261 and to ensure the proper wire-receiving position of the wire gripper 236 when such gear is unclutched, suitable stop devices such as hereinbefore described with respect to the gear 192 on the spindle 180 are provided; that it to say, the disk 265 has a laterally-projecting stud 295 which engages the notch 296 of a spring-controlled lever 297 as the gear 261 approaches the limit of its rotation. When the rock arm 267 is moved to swing the roll 266 from the path of the clutch lever 264, a lug 298 on the arm 267 pushes the lever 297 laterally and disengages its notch from the stud 295 on the disk 265. (See Figs. 1, 14 and 16.)

The two twisting mechanisms hereinbefore described are operated simultaneously so that when the wires and fibres for one brush have been associated and are being twisted together by and between the wire grippers 168, 169, the extending ends of the twisted wires of a previously formed brush body may be twisted by and between the wire grippers 235, 236 of the supplemental twisting mechanism, it being understood, of course, that the operator places and clamps the wires in the grippers of the respective twisting mechanisms before he operates the devices for clutching the gears 192, 261 to the hollow gripper spindle 180. During this interval a quota of bristles or fibres for a third brush is being assembled in the rack as previously mentioned.

Since the main or body twisting operation of the core wires occupies a longer period of time than the supplemental or end twisting of the wires the independent clutch and clutch releasing mechanism M to control the variable operative periods of the supplemental twisting mechanism, is employed.

It is to be understood that my invention is not limited to the particular construction disclosed, as the mechanisms may be modified within the principle of the invention and the scope of the appended claims.

I claim—

1. The combination with means for supplying fibres, of an intermittently-movable endless fibre-assembling rack, a transfer element between the fibre-supply means and the rack, means including a clutch element for actuating said rack and transfer element in co-operative relation, and mechanism for rendering said clutch element inactive when the rack has received its quota of fibres for a brush, thereby stopping the travel of the rack and the operation of the transfer element.

2. The combination with means for supplying fibres, of an intermittently-movable endless fibre-assembling rack, a transfer element between the fibre-supply means and the rack, means including a clutch element for actuating said rack and transfer element in co-operative relation, mechanism for rendering said clutch element inactive when the rack has received its quota of fibres for a brush, thereby stopping the travel of the rack and the operation of the transfer element, and means under the control of the operator for re-engaging the clutch element to effect a succeeding advancement of the rack and complemental operation of the transfer element.

3. The combination with means for supplying fibres, of a fibre-assembling rack comprising an endless chain having fibre-receiving spaces throughout its length, a transfer element between the fibre-supply means and the rack, a shaft, operative connection between said shaft and the transfer element, operative connection between the transfer element and the rack, a continuously-driven element on said shaft, a clutch operative to connect said element to the shaft, and mechanism for automatically releasing said clutch at a predetermined period in the travel of the rack.

4. The combination with means for supplying fibres, of a fibre-assembling rack comprising an endless chain having fibre-receiving spaces throughout its length, a transfer element between the fibre supply means and the rack, a shaft, operative connection between said shaft and the transfer element, operative connection between the transfer element and the rack, a continuously-driven element on said shaft, a clutch operative to connect said element to the shaft, mechanism for automatically releasing said clutch at a predetermined period in the travel of the rack, and means under the control of the operator for re-engaging the clutch.

5. The combination with means for supplying fibres, of a fibre-assembling rack comprising an endless chain having fibre-receiving spaces throughout its length, a transfer element between the fibre supply means and the rack, a shaft, operative connection between said shaft and the transfer element, operative connection between the transfer element and the rack, a continuously-driven element on said shaft, a clutch operative to connect said element to the shaft, and mechanism, including adjustable timing devices, for automatically releasing said clutch at a predetermined period in the travel of the rack.

6. The combination with fibre supply means having two independent feed portions, a fibre transfer element mounted in operative relation to said feed portions and including a fibre control member, and means including a cam for intermittently actuating said control member whereby the transfer element is normally operative to transfer fibre from said feed portions in alternation to a common point of discharge, of a supplemental cam for actuating said control member, and means whereby the latter cam may be periodically positioned in active relation to the control member to render the transfer element inactive in respect to the fibres in one feed portion during a succession of active operations of the transfer element in respect to the fibres in the other feed portion.

7. The combination with fibre supply means having two independent feed portions, a fibre transfer element mounted in operative relation to said feed portions and including a fibre control member, and means including a cam for intermittently actuating said control member whereby the transfer element is normally operative to transfer bunches of fibre from said feed portions in alternation to a common point of discharge, of a supplemental cam for actuating said control member, and means including a rack member and a detachable link connection, whereby the latter cam may be periodically positioned in active relation to the control member to render the transfer element inactive in respect to the fibres in one feed portion during a succession of active operations of the transfer element in respect to the fibres in the other feed portion.

8. The combination with two juxtaposed fibre supply compartments, of a fibre-assembling rack, means for intermittently moving said rack, an oscillatory transfer head between the compartments and the rack constructed and arranged to transfer the fibres from the compartments to the rack, said head including fibre-receiving portions and co-acting fibre-control means, means for oscillating said head with respect to the said compartments and the rack, and means including a vibratory cam for actuating the control means in such timed relation to the travel of the rack that the removal of fibres from one of the compartments can be discontinued while a plurality of succeeding bunches of fibres are being transferred from the other compartment and discharged.

9. The combination with fibre supply means having two independent feed portions, and an oscillatory fibre transfer element mounted in operative relation to said feed portions and normally operative to transfer bunches of fibre therefrom in alternation to a common point of discharge, of means including a vibratory cam member whereby the transfer element is rendered inactive with respect to the fibres in one feed portion during a succession of transfer operations of the said element with respect to the fibres in the other feed portion.

10. The combination with fibre supply means having two independent feed portions, and an oscillatory fibre transfer head mounted in operative relation to said feed portions and normally operative to transfer bunches of fibre therefrom in alternation to a common point of discharge, of means including a vibratory cam member whereby the transfer head is rendered inactive with respect to the fibres in one feed portion during a succession of transfer operations of the head with respect to the fibres in the other feed portion, and means whereby said vibratory cam can be rendered active and inactive at will.

11. The combination with fibre-supply means having two independent feed portions, of an oscillatory fibre transfer head mounted in operative relation to said feed portions, said head comprising a body having peripheral fibre-receiving portions in spaced relation, control levers mounted on and carried by said body and movable adjacent said receiving portions toward and from the periphery of the body, resilient means urging said levers toward the periphery of the body, a stationary cam constructed and arranged to move the levers inwardly against the action of the resilient means in timed relation to the oscillatory motion of the body, means for oscillating said body to present the receiving portions thereof at intervals to the respective feed portions and to a common point of delivery, a second cam associated with the stationary cam, and means for periodically moving said second cam into co-operative relation to the levers during the oscillation of the transfer head, whereby the removal of fibres from one of the feed portions can be discontinued while a plurality of succeeding bunches of fibres are being transferred from the other feed portion and discharged.

12. The combination with fibre-supply means having two independent feed portions, of an oscillatory fibre transfer head mounted in operative relation to said feed portions, said head comprising a body having peripheral fibre-receiving portions in spaced relation, control levers mounted on and carried by said body and movable adjacent said receiving portions toward and from the periphery of the body, resilient means urging said levers toward the periphery of the body, a stationary cam constructed and arranged to move the levers inwardly against the action of the resilient means in timed relation to the oscillatory motion of the body, means for oscillating said body to present the receiving portions thereof at intervals to the respective feed portions and to a common point of delivery, a second cam associated with the stationary cam, and means for periodically moving said second cam into co-operative relation to the levers during the oscillation of the transfer head, whereby the removal of fibres from one of the feed portions can be discontinued while a plurality of succeeding bunches of fibres are being transferred from the other feed portions and discharged, and means whereby the second cam can be rendered active or inactive at will.

13. The combination with fibre-supply means having two independent feed portions, of an oscillatory fibre transfer head mounted in operative relation to said feed portions, said head comprising a body having peripheral fibre-receiving portions in spaced relation, control levers mounted on and carried by said body and movable adjacent said receiving portions toward and from the periphery of the body, resilient means urging said levers toward the periphery of the body, a stationary cam constructed and arranged to move the levers inwardly against the action of the resilient means in timed relation to the oscillatory motion of the body, means for oscillating said body to present the receiving portions thereof at intervals to the respective feed portions and to a common point of delivery, a second cam associated with the stationary cam, means for periodically moving said second cam into co-operative relation to the levers during the oscillation of the transfer head, whereby the removal of fibre from one of the feed portions can be discontinued while a plurality of succeeding bunches of fibres are being transferred from the other feed portion and discharged, means whereby the second cam can be rendered active or inactive at will, said last named means including a crank element connected with the second cam, a rock-lever, a positively driven cam for actuating said rock-lever, and a link connecting said lever with the crank element.

14. The combination with means for supplying fibres, of an intermittently-movable fibre-assembling rack, a transfer element between the fibre-supply means and the rack, means including a clutch element for actuating said rack and said transfer means in co-operative relation, and mechanism for rendering said clutch element inactive at any predetermined interval in the travel of the rack, said mechanism including clutch controlling devices and timing devices co-operating therewith.

15. The combination with means for supplying fibres, of an intermittently-movable fibre-assembling rack, a transfer element between the fibre-supply means and the rack, means including a clutch element for actuating said rack and said transfer means in co-operative relation, and mechanism for rendering said clutch element inactive at a predetermined interval in the travel of the rack, said mechanism including clutch controlling devices and timing devices co-operating therewith, said timing devices including a rotary screw element and a trip member engaged therewith.

16. The combination with means for supplying fibres, of an intermittently-movable fibre-assembling rack, a transfer element between the fibre-supply means and the rack, means including a clutch element for actuating said rack and transfer means in co-operative relation, and mechanism for rendering said clutch element inactive at a predetermined interval in the travel of the rack, said mechanism including clutch controlling devices and timing devices co-operating therewith, said timing devices including a rotary screw element, a trip member engaged therewith, and an adjustable stop on said screw element to determine the initial position of the trip member.

17. The combination with means for supplying fibres of an intermittently-movable fibre-assembling rack, a transfer element between the fibre-supply means and the rack, means including a clutch element for actuating said rack and transfer means in co-operative relation, and mechanism for rendering said clutch element inactive at a predetermined interval in the travel of the rack, said mechanism including clutch controlling devices, timing devices co-operating therewith, and means operative to set the said controlling and timing devices in their initial position when the clutch member is returned to active position.

18. The combination with means for supplying fibres, of an intermittently-movable fibre-assembling rack, a transfer element between the fibre-supply means and the rack, means including a clutch element for actuating said rack and transfer means in co-operative relation, and mechanism for rendering said clutch element inactive at a predetermined interval in the travel of the rack, said mechanism including clutch controlling devices and timing devices co-operating therewith, said timing devices including a rotary screw element, a trip member engaged therewith, and connections between said screw element and the actuating means operative to rotate the screw element when the clutch is in active position.

19. The combination with an intermittently-movable rack, means for progressively supplying fibres thereto, means for operating said rack and fibre supply means in timed relation, and means for automatically stopping the operations of said rack and fibre-supply mechanism when the rack has received a layer of fibres, of main core-wire twisting mechanism including a pair of spaced-apart grippers constructed and arranged to receive wires of greater length than the layer of fibres, and support said wires in substantial parallelism with the layer of fibres, a fibre-positioning element movable toward and from the rack in a path between the grippers, said element operable to withdraw the layer of fibres from the rack and also to position the layer between the grippers into core-wire engaging position, means for rotating one of said grippers, whereby the bodies of the wires are twisted longitudinally of the interposed layer of fibres and untwisted end portions of the wire are provided, means for automatically checking the operation of the rotating gripper after a prescribed number of rotations, a supplemental wire twisting mechanism including a pair of spaced-apart grippers constructed and arranged to receive the extremities of the twisted core wires, means for rotating one of said supplemental grippers, and means for automatically checking the operation of the rotating supplemental gripper when the wire extensions have been fully twisted.

20. In a brush machine having a travelling fibre-assembling rack, a fibre-settling blade extending longitudinally of the path of the rack to bear yieldably upon the contained fibres in the rack, and means for vertically adjusting said blade with respect to the path of the rack.

21. In a brush machine having a travelling fibre-assembling rack, and means for delivering fibres at spaced-apart stations to the rack, of a resilient pressure member extending longitudinally of the path of the rack to bear yieldably upon the contained fibres in the rack as they pass from one station to the other.

Signed at Frederick, in the county of Frederick and State of Maryland, this 5th day of January, A. D. 1932.

WILLIAM D. LIPPS.